(12) United States Patent
Wakabayashi et al.

(10) Patent No.: US 6,243,163 B1
(45) Date of Patent: Jun. 5, 2001

(54) WAVELENGTH DETECTOR

(75) Inventors: Osamu Wakabayashi; Tatsuo Enami; Shinji Nagai; Toru Suzuki; Takeshi Ohta; Hirokazu Kubo, all of Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/398,191

(22) Filed: Sep. 17, 1999

(30) Foreign Application Priority Data

Sep. 21, 1998 (JP) .................................................. 10-266582
Feb. 26, 1999 (JP) .................................................. 11-050952
Feb. 26, 1999 (JP) .................................................. 11-051611

(51) Int. Cl.$^7$ ..................................................... G01J 3/28

(52) U.S. Cl. .................. 356/326; 356/320; 356/319; 356/318

(58) Field of Search .................................. 356/319, 320, 356/318, 326

(56) References Cited

FOREIGN PATENT DOCUMENTS

| 11283558 | 10/1999 | (JP) . |
| WO9960674 | 11/1999 | (WO) . |

*Primary Examiner*—Frank G. Font
*Assistant Examiner*—Reginald A. Ratliff
(74) *Attorney, Agent, or Firm*—Varndell & Varndell, PLLC

(57) ABSTRACT

The present invention can accurately detect a wavelength of a light to be detected, which is output from a source of light to be detected, without an error even if there is a change in the characteristic of a spectroscope due to an individual difference among the spectroscopes or a change in the measuring environment. The device according to the invention emits at least two reference lights (Ln, La) having different wavelengths ($\lambda n$, $\lambda a$) as the reference lights by reference light source. And, actual characteristic value (D) of spectroscope is calculated on the basis of detection positions (Sn, Sa) of the at least two reference lights (Ln, La) on a sensor and the known wavelengths ($\lambda n$, $\lambda a$) of the at least two reference lights (Ln, La) ($D=(\lambda a-\lambda n)/(Sa-Sn)$). And, on the basis of the detection positions (Sn, SO) of the reference light (Ln) and the light to be detected (LO) on the sensor (10), the calculated actual characteristic value (D) of the spectroscope and the known wavelength ($\lambda n$) of the reference light (Ln), wavelength ($\lambda O$) of the light to be detected (LO) is calculated ($\lambda O=\lambda n+(SO-Sn)\cdot D$).

14 Claims, 25 Drawing Sheets

WAVELENGTH DETECTOR

TECHNICAL FIELD OF THE INVENTION

The present invention relates to a wavelength detector which detects the wavelength of a light such as lasers, and more particularly to a wavelength detector suitable for detecting the wavelength of an oscillation laser beam of an argon fluorine (ArF) excimer laser, a krypton fluorine (KrF) excimer laser and a fluorine molecule F2 laser.

BACKGROUND OF THE INVENTION

When the excimer laser or fluorine molecule F2 laser is used as a light source for a stepper (reduction projection exposure device), it is necessary to make the oscillation laser beam of the excimer laser to have a narrow band. Furthermore, it is necessary to make the stabilization control with high accuracy so that the central wavelength of the spectrum of the narrowbanded oscillation laser beam does not displace while exposing.

FIG. 34 shows a general laser wavelength stabilization controller.

Narrowbanding is conducted by driving a narrowbanding element such as an etalon and a grating provided in narrowbanding module 26 via driver 46 by controller 20 (e.g., adjusting a set angle of the etalon or the grating). When exposing, the wavelength is controlled so that the central wavelength of the spectrum does not vary.

Specifically, an absolute wavelength of oscillation laser beam LO is detected by constantly detecting a relative wavelength of the oscillation laser beam LO to a reference light in monitor module 22 when exposing.

Then, a detected result is fed back to the controller 20, and the narrowbanding element is driven via the driver 46.

And, the central wavelength of the spectrum of the laser beam LO emitted through laser chamber 27 is fixed at a target wavelength.

Japanese Patent Applicaiton Laid-Open No. 4-163980 uses an emission line of arsenic (As) having a wavelength of 193.696 nm as a reference light for detecting an absolute wavelength of the oscillation laser beam of an argon fluorine excimer laser (a wavelength of about 193.3 nm).

Specifically, the emission line from an arsenic-enclosed discharge lamp is entered a spectroscope as a reference light. At the same time, the oscillation laser beam of the argon fluorine excimer laser is entered the same spectroscope as a light to be detected (subject light) for its wavelength. And, the spectroscope separates the entered lights into the reference light and the subject light, and the separated light images are formed on a line sensor. Detection positions on the line sensor correspond to detection wavelengths.

A relative wavelength of the subject light to the reference light is determined from a difference between the detection positions on the line sensor by using a dispersion value. And, the absolute wavelength of the subject light is calculated on the basis of the determined relative wavelength and the wavelength of the known reference light.

Now, the dispersion value will be described.

FIG. 35 shows a relation between a sensor channel number (positions on the line sensor) and a sensor signal strength of the line sensor. The line sensor has a plurality of light-receiving channels and determines the light-detecting positions on the line sensor according to the channel number having detected a light of maximum intensity. The wavelength of the light can be detected from the light-detecting position of the line sensor because an incidence position on the line sensor is variable depending on a wavelength. Thus, the wavelength of light is determined from the channel number having detected the light.

The dispersion value indicates a wavelength (in nm) corresponding to a channel space (in $\mu$m) of the line sensor. When the dispersion value (a wavelength corresponding to a channel space of the line sensor) can be determined, a relative wavelength of a light to be detected (subject light) LO to reference light La can be determined from a difference between channel number Sa having detected the reference light La by using this dispersion value and channel number SO having detected the subject light LO.

Correspondence (dispersion value) of the channel space and a wavelength of what level is determined depending on the characteristic of the spectroscope which guides the light onto the sensor. The characteristic of the spectroscope depends on the number of grating grooves, a focal distance of a concave mirror, a refractive index of light in the air and other characteristic values of various types of optical elements configuring the spectroscope.

Here, it was conventionally assumed that the characteristic of the spectroscope was known, namely the dispersion value was a known value, to calculate wavelength $\lambda$O of the subject light.

Specifically, theoretical (design of the spectroscope) dispersion value Dt (a wavelength of each channel of the sensor) is determined for each spectroscope on the basis of a design value of the focal distance etc. of the concave mirror in the spectroscope.

And, the obtained theoretical dispersion value Dt is fixed, a relative wavelength of the subject light LO to the reference light La is determined from a difference between the detected channel number Sa of the reference light La and the detected channel number SO of the subject light LO. And, the wavelength $\lambda$O of the subject light LO is calculated from the determined relative wavelength and the known wavelength $\lambda$a (193.696 nm) of the reference light La.

But, the designed characteristic value of the spectroscope is slightly different from the characteristic value of each produced spectroscope. In other words, the theoretical dispersion value Dt contains an error depending on an individual difference among the spectroscopes.

Moreover, the characteristic of the spectroscope is variable depending on a change in the measurement environment such as a change in temperature and a change in pressure. For example, a space between the grating grooves is varied when a temperature changes. And, a refractive index of light in the air is varied due to a change in pressure. Therefore, the relation between the detection position on the sensor and the wavelength is varied due to the change in temperature and pressure.

As described above, actual dispersion value D of the spectroscope indicates a value different from the theoretical dispersion value Dt due to a difference between the designed characteristic of the spectroscope and the actual characteristic of each produced spectroscope and a change in characteristic of the spectroscope due to the change in the measurement environment. Therefore, on the assumption that the characteristic of the spectroscope is known, namely the theoretical dispersion value Dt is known, the relative wavelength of the subject light LO to the reference light La is determined from a difference between the detection channel number Sa of the reference light La and the detection channel number SO of the subject light LO. And, when the wavelength $\lambda$O of the subject light LO is calculated from the obtained relative wavelength and the known wavelength λa (193.696 nm) of the reference light La, the obtained wavelength λO includes a detection error. The wavelength λO is required to have a detection accuracy of 0.0001 nm order, but such a requirement cannot be fulfilled.

The present invention was achieved in view of the above circumstances. And, it is a primary object of the invention to enable error-free and very accurate detection of a wavelength of the subject light output from the subject light source even if the characteristic of the spectroscope is varied due to the individual differences among the spectroscopes or the changes in the measurement environment.

When the subject light is a fluorine molecule F2 laser, a relative wavelength of the subject light LO to the reference light cannot be determined by using the dispersion value as described above because the reference light which can be used to stabilize the wavelength is not known yet.

Therefore, when the fluorine molecule F2 laser was used for exposing, it was hard to control so that the central wavelength λO of the spectrum of the oscillation laser beam LO does not vary.

The invention was achieved in view of the above circumstance, and it is a second object of the invention to prevent the central wavelength λO of the spectrum of the oscillation laser beam LO from varying when exposing by the reference light even when the fluorine molecule F2 laser is used as the subject light.

SUMMARY OF THE INVENTION

In order to achieve the aforesaid first object of the invention, a first aspect of the invention relates to a wavelength detector which enters a reference light emitted from a reference light source and a light to be detected emitted from a source of light to be detected into a spectroscope, guides the reference light and the light to be detected to a sensor, and calculates a wavelength of the light to be detected on the basis of detection positions of the reference light and the light to be detected on the sensor, a characteristic value of the spectroscope and a known wavelength of the reference light, wherein: at least two reference lights having different wavelengths are emitted as the reference light from the reference light source; an actual characteristic value of the spectroscope is calculated on the basis of detection positions of the at least two reference lights on the sensor and known wavelengths of the at least two reference lights; and the wavelength of the light to be detected is calculated on the basis of the detection positions of the reference lights and the light to be detected on the sensor, the calculated actual characteristic value of the spectroscope and the known wavelengths of the reference lights.

To achieve the aforesaid first object, a second aspect of the invention relates to a wavelength detector which enters reference light emitted from a reference light source and a light to be detected emitted from a source of light to be detected into a spectroscope, guides the reference light and the light to be detected to a sensor, and calculates a wavelength of the light to be detected on the basis of detection positions of the reference light and the light to be detected on the sensor, a dispersion value of the spectroscope and a known wavelength of the reference light, wherein: at least two reference lights having different wavelengths are emitted as the reference light from the reference light source; an actual dispersion value of the spectroscope is calculated on the basis of detection positions of the at least two reference lights on the sensor and known wavelengths of the at least two reference lights; and the wavelength of the light to be detected is calculated on the basis of the detection positions of the reference lights and the light to be detected on the sensor, the calculated actual dispersion value of the spectroscope and the known wavelengths of the reference lights.

And, to achieve the first object, a third aspect of the invention relates to a wavelength detector which enters a reference light emitted from a reference light source and a light to be detected emitted from a source of light to be detected into a spectroscope, guides the reference light and the light to be detected to a sensor, and calculates a wavelength of the light to be detected on the basis of detection positions of fringe patterns of the reference light and the light to be detected on the sensor and a known wavelength of the reference light, wherein: at least two reference lights having different wavelengths are emitted as the reference light from the reference light source; a relation between positions of the fringe patterns on the sensor and the wavelengths of the lights led to the sensor is calculated on the basis of detection positions of the fringe patterns of the at least two reference lights on the sensor and known wavelengths of the at least two reference lights; and a wavelength of the light corresponding to the detected position of the fringe pattern of the light to be detected on the sensor is determined from the calculated relation so to calculate the wavelength of the light to be detected.

A fourth aspect of the invention relates to the wavelength detector according to the aforesaid first to third aspects of the invention, wherein the light to be detected which is emitted from the source of light to be detected is an oscillation laser beam output from an argon fluorine excimer laser, and the at least two reference lights having different wavelengths emitted from the reference light source are emission lines of arsenic As and neon Ne.

And, a fifth aspect of the invention relates to the wavelength detector according to the fourth aspect of the invention, wherein the reference light source is an arsenic lamp using neon Ne as buffer gas.

The first aspect of the invention will be described with reference to FIG. 1 and FIG. 2.

Specifically, according to the first aspect of the invention, at least two reference lights Ln, La having different wavelengths λn, λa are emitted as reference lights from reference light source 2.

And, actual characteristic value D of the spectroscope 7 is calculated (D=(λa−λn)/(Sa−Sn)) on the basis of the detection positions Sn, Sa of at least two reference lights Ln, La and the known wavelengths λn, λa of at least two reference lights Ln, La on the sensor 10.

Then, wavelength λO of the subject light (light to be detected) LO is calculated (λO=λn+(SO−Sn)·D) on the basis of the detection positions Sn, SO of the reference light Ln and the subject light LO on the sensor 10, the calculated actual characteristic value D of the spectroscope 7 and the known wavelength λn of the reference light Ln.

"The actual characteristic value of the spectroscope" of the first aspect of the invention is a concept including the characteristic values other than the dispersion value D. It is a concept including the characteristic values such as focal distance f of the concave mirror M2 and density N of the number of grooves of the grating 8 in the spectroscope (see the expressions (3) to (11) in the embodiments).

According to the second aspect of the invention, at least two reference lights Ln, La having different wavelengths λn, λa are emitted as the reference lights from the reference light source 2.

And, actual dispersion value D of the spectroscope 7 is calculated (D=(λa−λn)/(Sa−Sn)) on the basis of the detection positions Sn, Sa of at least two reference lights Ln, La and the known wavelengths $\lambda$n, $\lambda$a of at least two reference lights Ln, La on the sensor 10.

Then, wavelength $\lambda$O of the subject light LO is calculated ($\lambda$O=$\lambda$n+(SO−Sn)·D) on the basis of the detection positions Sn, SO of the reference light Ln and the subject light LO on the sensor 10, the calculated actual dispersion value D of the spectroscope 7 and the known wavelength $\lambda$n of the reference light Ln.

Thus, according to the first and second aspects of the invention, the actual characteristic value (dispersion value D) of the spectroscope 7 is determined, and the wavelength $\lambda$O of the subject light LO is calculated on the basis of the actual characteristic value (dispersion value D), so that even if there is an individual difference among the spectroscopes 7 or a change in the measurement environment to change the characteristic of the spectroscope 7, wavelength $\lambda$O of the subject light LO output from subject light source (light source to be detected) 1 can be detected accurately without an error.

The third aspect of the invention will be described with reference to FIG. 10 and FIG. 11.

Specifically, according to the third aspect of the invention, the reference light source 2 emits at least two reference lights Ln, La having different wavelengths $\lambda$n, $\lambda$a as the reference lights.

And, relation Q between position R2 of the fringe pattern on the sensor 18 and wavelength $\lambda$ of the light guided to the sensor 18 is calculated on the basis of the detection positions Rn, Ra of the fringe patterns 19*b*, 19*a* of at least two reference lights Ln, La and the known wavelengths $\lambda$n, $\lambda$a of at least two reference lights Ln, La on the sensor 18 (see FIG. 11).

And, the wavelength $\lambda$O of the light corresponding to the detection position RO of the fringe pattern 19*c* of the subject light LO on the sensor 18 is determined from the relation Q calculated above to calculate the wavelength $\lambda$O of the subject light LO.

According to the third aspect of the invention, even if there is an individual difference among the spectroscopes or a change in the measurement environment to change the characteristic of the spectroscope, actual relation Q between the position R2 of the fringe patterns on the sensor 18 and the wavelength $\lambda$ of the light guided to the sensor 18 can be determined accurately, so that the wavelength $\lambda$O of the subject light LO output from the subject light source 1 can be detected accurately without an error.

As shown in FIG. 2, according to the fourth aspect of the invention, emission line Ln of neon Ne having wavelength $\lambda$n=193.00345 nm smaller than wavelength $\lambda$O=193.3 nm of the subject light (the oscillation laser beam of the argon fluorine excimer laser) LO and emission line La of arsenic As having wavelength $\lambda$a=193.7590 nm larger than that of the subject light LO are used as the reference lights.

Thus, the wavelength $\lambda$O of the subject light LO can be determined accurately by interpolation because the wavelength $\lambda$O of the subject light LO is present between the wavelengths $\lambda$n and $\lambda$a of the two reference lights Ln, La.

According to the fifth aspect of the invention, the reference light source 2 shown in FIG. 1 is an arsenic (As) lamp having neon Ne as the buffer gas.

Thus, according to the fifth aspect of the invention, two reference lights Ln (neon), La (arsenic) can be emitted from one reference light source 2, so that it is not necessary to separately provide two reference light sources.

To achieve the first object, a sixth aspect of the invention relates to a wavelength detector for detecting a wavelength of a light to be detected, which is output from a source of light to be detected, on the basis of a wavelength of a reference light emitted from a reference light source, wherein when the light to be detected is an argon fluorine excimer laser emission line, at least one emission line is used as the reference light among three emission lines of platinum Pt which have a wavelength most approximate to a wavelength of the argon fluorine excimer laser emission line and light intensity at a predetermined level or higher.

The sixth aspect of the invention will be described with reference to FIG. 13.

Specifically, according to the sixth aspect of the invention, among the three emission lines of platinum Pt which have a wavelength most approximate to a wavelength of the argon fluorine excimer laser emission line and light intensity at a predetermined level or higher, at least one emission line is used as the reference light of the reference light source.

For example, when three emission lines LP1, LP2, LP3 of platinum Pt having a wavelength most approximate to the wavelength $\lambda$O of the subject light LO of the argon fluorine excimer laser are used as the reference lights as shown in FIG. 13, the wavelength $\lambda$O of the subject light LO is detected on the basis of the wavelengths $\lambda$P1, $\lambda$P2, $\lambda$P3 of the reference lights LP1, LP2, LP3 on the sensor 10.

Thus, according to the sixth aspect of the invention, the wavelength $\lambda$O of the subject light (light to be detected) LO can be detected because at least one emission line is used as the reference light among the three emission lines of platinum Pt having a wavelength most approximated to the wavelength of the argon fluorine excimer laser emission line and light intensity at a predetermined level or higher.

Therefore, even if there is an individual difference among the spectroscopes 7 or a change in the measurement environment to change the characteristic of the spectroscope 7, the wavelength $\lambda$O of the subject light LO output from the subject light source (light source to be detected) 1 can be detected accurately without an error.

And, to achieve the first object, a seventh aspect of the invention relates to a wavelength detector for detecting a wavelength of a light to be detected which is output from a source of light to be detected on the basis of an absorption line which minimizes light intensity of the light to be detected, wherein when the light to be detected is an argon fluorine excimer laser emission line, at least one absorption line is used as an absorption line to the argon fluorine excimer laser emission line among absorption lines of platinum Pt, arsenic As, neon Ne, carbon C and germanium Ge that have a wavelength approximate to a wavelength of the argon fluorine excimer laser emission line.

The seventh aspect of the invention will be described with reference to FIG. 14.

Specifically, according to the seventh aspect of the invention, gas having an absorption line which minimizes the light intensity of the subject light LO output from the subject light source 1 is sealed in absorption cell 23. Here, when the subject light LO is an argon fluorine excimer laser emission line, among the absorption lines of platinum Pt, arsenic As, neon Ne, carbon C and germanium Ge having a wavelength approximate to that of the argon fluorine excimer laser emission line, at least one absorption line is used as the absorption line to the argon fluorine excimer laser emission line. And, emission line LO of the argon fluorine laser of the subject light is input to the absorption cell 23 and detected on the sensor 10 through diffuser 15*a* and spectroscope 7, and wavelength λ0 of the subject light LO is determined on the basis of the wavelength of at least one absorption line among the absorption lines of platinum Pt, arsenic As, neon Ne, carbon C and germanium Ge.

Thus, according to the seventh aspect of the invention, when the subject light LO is an argon fluorine excimer laser emission line, the wavelength λ0 of the subject light LO can be detected because at least one absorption line is used as the absorption line to the argon fluorine excimer laser emission line among the absorption lines of platinum Pt, arsenic As, neon Ne, carbon C and germanium Ge having a wavelength approximate to that of the argon fluorine excimer laser emission line.

Thus, even if there is an individual difference among the spectroscopes 7 or a change in the measurement environment to change the characteristic of the spectroscope 7, the wavelength λ0 of the subject light LO output from the subject light source 1 can be detected accurately without an error.

In order to achieve the aforesaid second object, an eighth aspect of the invention relates to a wavelength detector for detecting a wavelength of a light to be detected, which is output from a source of light to be detected, on the basis of a wavelength of a reference light emitted from a reference light source, wherein when the light to be detected is a fluorine molecule F2 laser emission line, at least one emission line of carbon C, iron Fe, sodium Na, fluorine F, magnesium Mg, aluminum Al, argon Ar, calcium Ca, scandium Sc, chromium Cr, manganese Mn, nickel Ni, copper Cu, germanium Ge, arsenic As, bromine Br or platinum Pt that have a wavelength approximate to that of the fluorine molecule F2 laser emission line and light intensity of a predetermined level or higher is used as the reference light.

And, to achieve the second object, a ninth aspect of the invention relates to a wavelength detector for detecting a wavelength of a light to be detected, which is output from a source of light to be detected, on the basis of a wavelength of a reference light emitted from a reference light source, wherein when the light to be detected is a fluorine molecule F2 laser emission line, an emission line of either of carbon C or iron Fe or two emission lines of carbon C and iron Fe are used as the reference light.

The eighth and ninth aspects of the invention will be described with reference to FIG. 19 and FIG. 20.

Specifically, according to the eighth and ninth aspects of the invention, the emission line of at least one of carbon C, iron Fe, sodium Na, fluorine F, magnesium Mg, aluminum Al, argon Ar, calcium Ca, scandium Sc, chromium Cr, manganese Mn, nickel Ni, copper Cu, germanium Ge, arsenic As, bromine Br or platinum Pt is used as the reference light of the reference light source 2.

For example, where the emission line of carbon C having a wavelength most approximate to the wavelength λ0 of the subject light LO of the fluorine molecule F2 laser is used as the reference light LC, the wavelength λ0 of the subject light LO is detected on the basis of the wavelength λC of the reference light LC on the sensor 10.

And, for example, where emission line Le of iron Fe is used as reference light Le in addition to the reference light LC, wavelength λ0 of the subject light LO is detected on the basis of the wavelengths λC, λe of the reference lights LC, Le on the sensor 10.

As described above, according to the eighth and ninth aspects of the invention, the emission line of at least one of carbon C, iron Fe, sodium Na, fluorine F, magnesium Mg, aluminum Al, argon Ar, calcium Ca, scandium Sc, chromium Cr, manganese Mn, nickel Ni, copper Cu, germanium Ge, arsenic As, bromine Br or platinum Pt having a wavelength most approximate to the wavelength λ0 of the subject light LO of the fluorine molecule F2 laser and light intensity at a predetermined level or higher is used as the reference light, so that the wavelength λ0 of the subject light LO can be detected.

Therefore, for the fluorine molecule F2 laser, the wavelength λ0 of the subject light LO can be detected by using the reference light of the aforesaid elements. Thus, the central wavelength λ0 of the spectrum of the oscillation laser beam LO can be prevented from changing while exposing.

And, to achieve the second object, a tenth aspect of the invention relates to a wavelength detector for detecting a wavelength of a light to be detected which is output from a source of light to be detected on the basis of an absorption line which minimizes light intensity of the light to be detected, wherein when the light to be detected is a fluorine molecule F2 laser emission line, an absorption line of either of nitrogen N or germanium Ge or two absorption lines of nitrogen N and germanium Ge that have a wavelength approximate to a wavelength of the fluorine molecule F2 laser emission line are used as the absorption line to the fluorine molecule F2 laser emission line.

The tenth aspect of the invention will be described with reference to FIG. 14 and FIG. 31.

Specifically, according to the tenth aspect of the invention, the gas which has the absorption line minimizing the light intensity of the subject light LO output from the subject light source 1 is sealed in the absorption cell 23. Here, when the subject light LO is the emission line L1 of the fluorine molecule F2 laser, absorption line BG of germanium Ge gas which has a wavelength approximate to that of the fluorine molecule F2 laser emission line L1 is used. And, when the subject light is the emission line L2 of the fluorine molecule F2 laser, absorption line BN of nitrogen N gas having a wavelength approximate to that of the emission line L2 of the fluorine molecule F2 laser is used. And, the emission line L1 of the fluorine molecule F2 laser of the subject light is input to the absorption cell 23 and detected on the sensor 10 through diffuser 15a and spectroscope 7, and wavelength λ1 of the subject light L1 is determined on the basis of the wavelength λG of the absorption line BG of germanium Ge. And, when the subject light LO is emission line L2 of the fluorine molecule F2 laser, wavelength λ2 of the subject light L2 is determined on the basis of wavelength λN of the absorption line BN of nitrogen N.

Thus, according to the tenth aspect of the invention, when the subject light LO is the emission line L1 of the fluorine molecule F2 laser, the wavelength λ1 of the subject light L1 can be detected because the absorption line BG of germanium Ge which has a wavelength approximate to that of the emission line L1 of the fluorine molecule F2 laser is used.

And, when the subject light LO is the emission line L2 of the fluorine molecule F2 laser, the wavelength λ2 of the subject light L2 can be detected because the absorption line BN of nitrogen N which has a wavelength approximate to that of the emission line L2 of the fluorine molecule F2 laser is used.

Therefore, for the fluorine molecule F2 laser, the wavelengths λ1, λ2 of the subject lights L1, L2 can be detected by using the absorption lines BG, BN. Thus, the central wavelength λ0 of the spectrum of the oscillation laser beam LO can be prevented from changing while exposing.

BEST MODES FOR CARRYING OUT THE INVENTION

The wavelength detector according to the present invention will be described with reference to the accompanying drawings.

In this embodiment, a wavelength of the argon fluorine (ArF) excimer laser will be detected. But, it is to be understood that this embodiment can also be applied to the detection of a wavelength of the krypton fluorine (KrF) excimer laser. The krypton fluorine excimer laser has a wavelength of about 248.4 nm. The argon fluorine excimer laser has a wavelength of about 193.3 nm. It is also possible to apply this embodiment to the detection of the wavelength of a light other than a laser beam.

Figure 1:
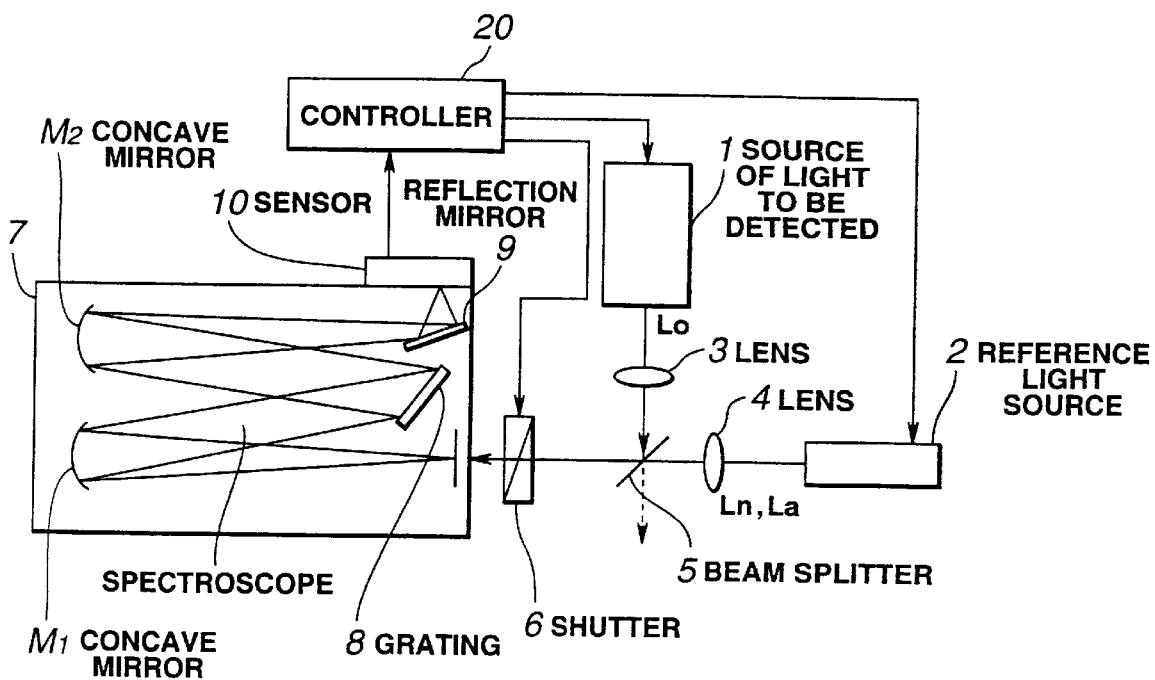
FIG. 1 is a diagram showing a structure of an embodiment of a wavelength detector according to the invention.

FIG. 1 shows a structure of the wavelength detector of this embodiment.

Figure 12:
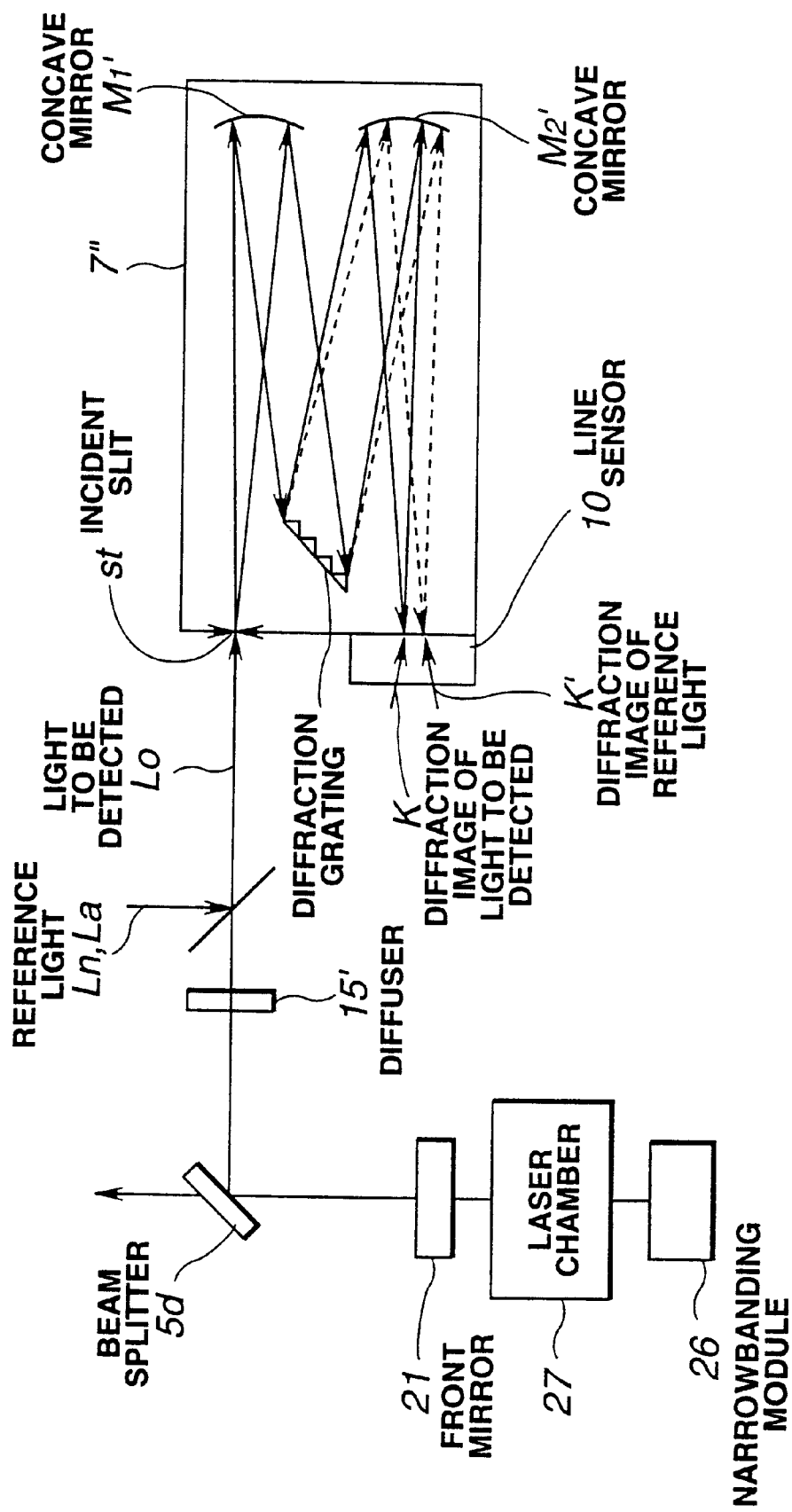
FIG. 12 is a diagram showing a modification of the diffraction grating type spectroscope according to the invention.

A source of light to be detected (subject light source) 1 is a light source which emits a light to be detected (subject light) LO whose wavelength is to be detected. And, it is an argon fluorine excimer laser device in this embodiment. The laser beam which is oscillated by the electric discharge pumping by a laser chamber of the argon fluorine excimer laser device is reciprocally moved within a resonator, which comprises, as shown in FIG. 12 described later, front mirror 21 and narrowbanding module 26, so to be amplified and emitted as oscillation laser beam LO of predetermined power from a laser retrieving window.

Meanwhile, reference light source 2 is an arsenic (As) lamp in which neon Ne is sealed as buffer gas. The buffer gas is sealed in the lamp to prevent its filament from being burnt. As for the arsenic lamp, a hollow cathode lamp is used. Therefore, the reference light source 2 emits emission line Ln of neon Ne having a wavelength of 193.00345 nm and emission line La of arsenic As having a wavelength 193.7590 nm as two reference lights Ln, La having different wavelengths. Thus, this embodiment provides an advantage that two reference lights Ln (neon) and La (arsenic) can be emitted from one reference light source 2. It is not necessary to separately provide two reference light sources.

The subject light LO is entered beam splitter 5 via lens 3. Part of the subject light LO is reflected by the beam splitter 5 and led to shutter 6. The reference lights Ln, La are entered the beam splitter 5 through lens 4. Part of the reference lights Ln, La permeates through the beam splitter 5 and is lead to the shutter 6.

As described above, the subject light LO and the reference lights Ln, La are passed through the shutter 6 to enter spectroscope 7.

When the subject light LO and the reference lights Ln, La have entered the spectroscope 7, they are first entered concave mirror M1. Then, the reflected lights are entered grating 8 which is a diffraction grating. The diffraction angle of the grating 8 changes depending on the wavelength of the incident light. The subject light LO and the reference lights Ln, La diffracted by the grating 8 are entered concave mirror M2, and the reflected lights are led to sensor 10 via reflector 9.

The sensor 10 is a line sensor. Specifically, it can be configured of one-dimensional or two-dimensional image sensor or diode array.

Entering of lights having different wavelengths into the spectroscope 7 results in different incidence positions on the sensor 10. As a result, the subject light LO and the reference lights Ln, La having different wavelengths are separately entered the sensor 10, and wavelengths $\lambda O$, $\lambda n$ and $\lambda a$ of the subject light LO and the reference lights Ln, La which were entered the spectroscope 7 can be detected according to the detection positions on the sensor 10. In other words, spectrum profile on the line sensor is variable depending on a wavelength of a light. A fringe pattern on the line sensor changes when an etalon is used instead of the grating.

The reference lights Ln, La emitted from the reference light source 2 and the subject light LO emitted from the subject light source 1 may be entered the spectroscope 7 simultaneously or with a time lag.

In this embodiment, the excimer laser device of the subject light source 1 is used as a light source for the stepper (reduction projection exposure device). In this case, it is necessary to make the oscillation laser beam LO of the excimer laser have a narrow band. It is also necessary to control for stabilization with high accuracy to prevent a spectral central wavelength of the narrowbanded oscillation laser beam LO from deviating during exposure.

Narrowbanding is performed by driving (e.g., adjusting the set angle of the etalon or the grating) the narrowbanding element such as the etalon or the grating disposed within the resonator of the laser chamber. The wavelength is controlled so that a spectral central wavelength does not change while exposing.

Therefore, the wavelength detector shown in FIG. 1 keeps detecting a relative wavelength of the oscillation laser beam LO to the reference lights Ln, La while exposing, so that absolute wavelength $\lambda O$ of the oscillation laser beam LO is detected. And, the narrowbanding element is driven as the detected result is fed back, and the spectral central wavelength of the oscillation laser beam LO is fixed to a target wavelength.

Figure 3:
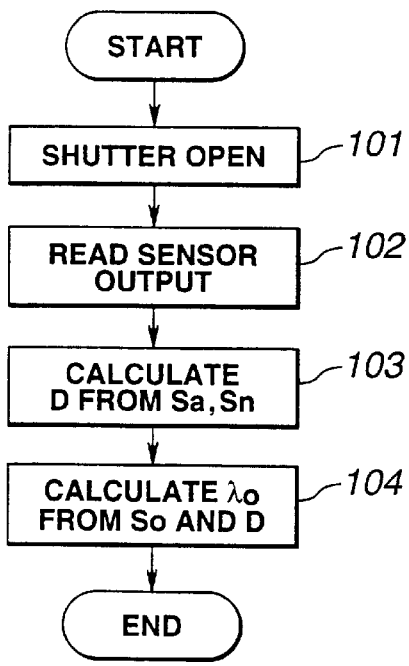
FIG. 3 is a flowchart showing a procedure of calculating a wavelength of a light to be detected.

The controller 20 performs the detection of a wavelength shown in FIG. 3 to be described afterward and executes the aforesaid wavelength fixing control on the basis of the obtained wavelength-detected result.

The principle applied to this embodiment will be described.

Figure 2:
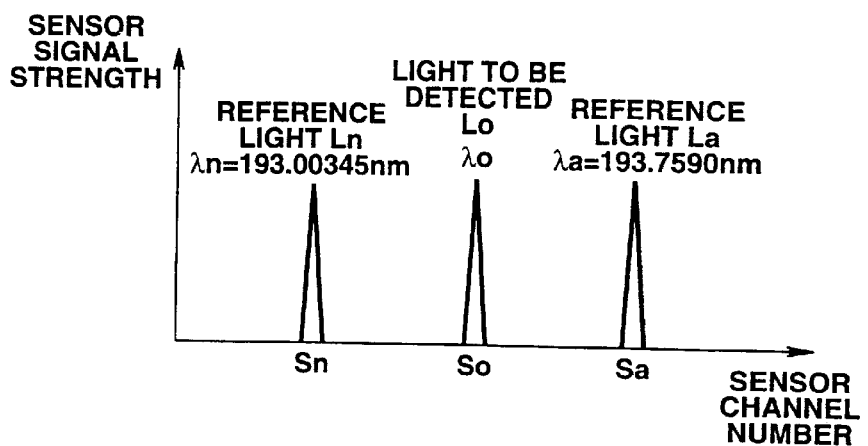
FIG. 2 is a diagram showing a relation between a sensor channel number and a sensor signal strength when a reference light source for outputting emission lines of neon and arsenic is used.

FIG. 2 shows a relation between channel number S (position on the line sensor) and a sensor signal strength of the sensor 10. The sensor 10 has a plurality of light-receiving channels, and the light detection position on the line sensor is determined according to the channel number having detected the light of maximum intensity. Because an incidence position on the line sensor is variable depending on the wavelength, the wavelength of a light can be detected from the light detection position on the line sensor. Thus, the wavelength of the light is determined from the channel number having detected the light.

Here, if the dispersion value D (wavelength which corresponds to the channel interval of the line sensor 10) of the spectroscope 7 can be determined, this dispersion value D can be used to convert a difference between the channel number Sn or Sa having detected the reference light Ln or La and the channel number SO having detected the subject light LO into a relative wavelength of the subject light LO to the reference light Ln or La. And, wavelength $\lambda O$ of the subject light LO can be calculated from the determined relative wavelength and the known wavelength $\lambda n$ (=193.00345 nm) or $\lambda a$ (=193.7590 nm) of the reference light Ln or La.

In this embodiment, considering that the dispersion value D of the above-mentioned spectroscope 7 changes depending on a change in the measurement environment, actual dispersion value D is determined, and the wavelength $\lambda O$ of the subject light LO is calculated on the basis of the obtained actual dispersion value D. Now, specific description will be made with reference to the flowchart of FIG. 3.

As shown in FIG. 3, controller 20 opens the shutter 6 of the wavelength detector shown in FIG. 1 and allows the subject light LO and the reference lights Ln, La enter the spectroscope 7 (step 101).

Output of the sensor 10 is read in the next step 102.

As shown in FIG. 2, sensor channel numbers Sn, SO, Sa corresponding to three peaks of the sensor signal strength are output from the sensor 10. Wavelength $\lambda n$ of the emission line of neon Ne is 193.00345 nm (in a vacuum), wavelength $\lambda a$ of the emission line of arsenic As is 193.7590 nm (in a vacuum), and $\lambda O$ of the emission line of the subject light LO is larger than $\lambda n$ and smaller than $\lambda a$ ($\lambda O$=193.3 nm).

Thus, the channel number SO larger than the channel number Sn having detected the emission line of neon Ne and smaller than the channel number Sa having detected the emission line of arsenic As is determined as the channel number having detected the oscillation laser beam LO (step 102).

Then, the dispersion value D (wavelength for a channel of the sensor 10) is calculated by using the channel numbers Sn, Sa having detected the two reference lights Ln, La and the known wavelengths λn (=193.00345 nm), λa (=193.7590 nm) of the two reference lights Ln, La as indicated by the following expression (1).

$$D=(\lambda a-\lambda n)/(Sa-Sn) \quad (1)$$

Wavelength λO of the subject light LO is determined by using the above-mentioned dispersion value D as indicated by the following expression (2).

$$\lambda O=\lambda n+(SO-Sn)\cdot D \quad (2)$$

Specifically, by multiplying the dispersion value D by the difference between the channel number SO having detected the subject light SO and the channel number Sn having detected the reference light Ln, relative wavelength (SO–Sn)·D of the subject light LO to the reference light Ln is determined. And, wavelength λO of the subject light LO is calculated by adding the known wavelength λn of the reference light Ln to the relative wavelength (SO–Sn)·D. In the aforesaid expression (2), the wavelength λn of neon Ne and the channel number Sn are used, but wavelength λa of arsenic As and channel number Sa may be used instead (step 104).

As described above, according to this embodiment, the actual dispersion value D of the spectroscope 7 is determined, and the wavelength λO of the subject light LO is calculated on the basis of the actual dispersion value D, so that even if the characteristic of the spectroscope 7 is varied due to an individual difference among the spectroscopes 7 or a change in the measurement environment, the wavelength λO of the subject light LO output from the subject light source 1 can be detected accurately without an error.

In the aforesaid embodiment, it is assumed that a relation between the channel position S of the sensor 10 and the wavelength λ is substantially linear as indicated by the aforesaid expression (1).

Now, a preferred embodiment in which the channel position S of the sensor 10 and the wavelength λ are not linearly related will be described. For example, this embodiment is suitable when the sensor 10 does not have a uniform width for a channel.

Figure 4:
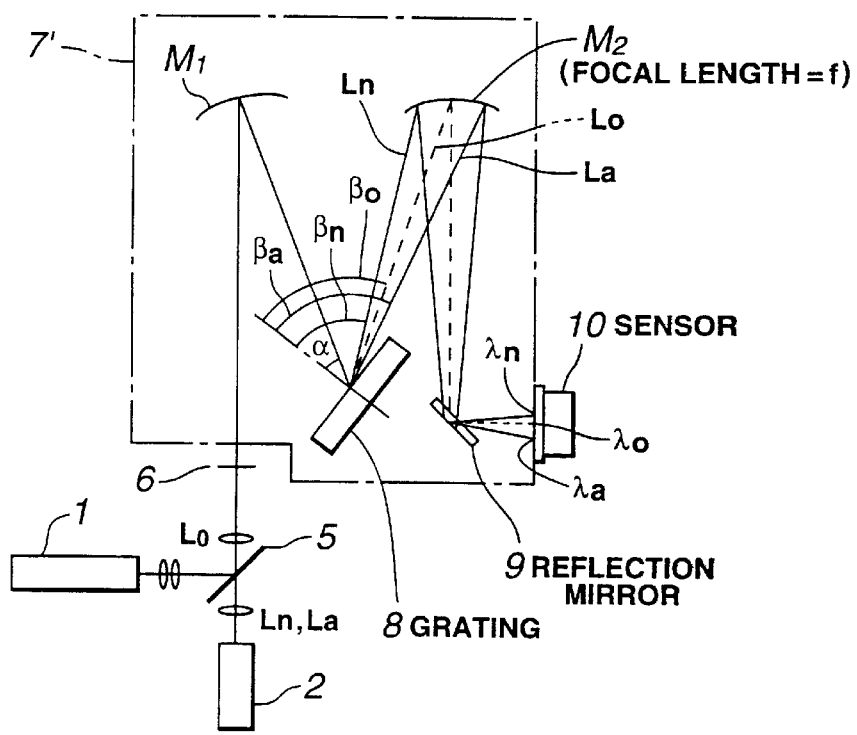
FIG. 4 is a diagram showing an arrangement of an optical system in a spectroscope.

FIG. 4 shows an arrangement of optical systems in the spectroscope where Czerny-Turner type grating spectroscope 7' is used instead of the spectroscope 7 of FIG. 1.

As shown in FIG. 4, when the subject light LO and the reference lights Ln, La are entered the spectroscope 7', they are first entered concave mirror M1, and the reflected lights are entered the grating 8. The incidence angle to the grating 8 is assumed to be α. An outgoing angle of the grating 8 is variable depending on the wavelength of the incident lights. It is assumed that the outgoing angle of the reference light Ln having wavelength λn is βn, the outgoing angle of the reference light La having wavelength λa is βa, and the outgoing angle of the subject light LO having wavelength λO is βO. The subject light LO and the reference lights Ln, La diffracted by the grating 8 are entered the concave mirror M2, and the reflected lights are led to the sensor 10 via reflector 9. The focal distance of the concave mirror M2 is assumed to be f (mm).

The controller 20 performs the same processing as in steps 101, 102.

In this embodiment, however, the subject light LO and the reference lights Ln, La are entered the spectroscope 7 simultaneously to measure three detection positions on the sensor 10 simultaneously. And, channel number Sn corresponding to a peak central wavelength is determined by interpolating the three channel positions where the sensor signal strength becomes a peak. Channel numbers Sa, SO are determined by the same interpolation.

And, the following processing is executed instead of steps 103,104.

A density of the number of grooves of the grating 8 is assumed to be N (gr/mm), and the diffraction degree of the grating 8 is assumed to be m. And, the width for 1 ch (channel) of the light-receiving channel of the sensor 10 is assumed to be MCD (mm/ch).

Then, the following expressions (3), (4), (5), (6) and (7) hold from the relation between the incidence angle and the outgoing angle of the grating 8.

$$N\cdot m\cdot \lambda n=\sin\alpha+\sin\beta n \quad (3)$$

$$N\cdot m\cdot \lambda a=\sin\alpha+\sin\beta a \quad (4)$$

$$N\cdot m\cdot \lambda O=\sin\alpha+\sin\beta O \quad (5)$$

$$\beta a=\beta n+\delta\beta na=\beta n+dna/f \quad (6)$$

$$\beta O=\beta n+\delta nO=\beta n+dnO/f \quad (7)$$

where, dna=(Sn–Sa)·MCD, and dnO=(Sn–SO)·MCD.

Therefore, $N\cdot m(\lambda n-\lambda a)=\sin\beta n-\sin\beta a$ is obtained from the expression (3)–the expression (4), and $N\cdot m(\lambda n-\lambda a)=\sin\beta n-\sin\beta a=k$ is established.

By substituting the expression (6) into the above expression, the following is obtained.

$$\sin\beta n-\sin(\beta n+dna/f)=k$$

$$2\sin(-dna/2f)\cdot\cos(\beta n+dna/2f)=k$$

Then, the following expression is obtained.

$$\beta n=a\cos(k/2\sin(-dna/2f))-dna/2f \quad (8)$$

From the expression (3) and the expression (8), the following is calculated.

$$\sin\alpha=N\cdot m\cdot \lambda n-\sin\beta n \quad (9)$$

And, from the expression (7) and the expression (8), the following is calculated.

$$\sin\beta O=\sin[a\cos\{k/2\cdot\sin(-dna/2f)-dna/2f\}+dnO/f] \quad (10)$$

Hence, from the expressions (5), (9) and (10), the wavelength λO is calculated as follows.

$$\lambda O=(\sin\alpha+\sin\beta O)/(N\cdot m) \quad (11)$$

As described above, the wavelength λO of the subject light LO can also be detected accurately considering the actual characteristic value of the spectroscope 7' in this embodiment.

In the aforesaid embodiment, the emission line Ln of neon Ne having a wavelength λn=193.00345 nm smaller than the wavelength λO=193.3 nm of the subject light LO and the emission line La of arsenic As having a wavelength λa=193.7590 nm larger than that of the same subject light LO are used as the reference lights as shown in FIG. 2, but the types of reference light (element types), the size of the wavelength to the subject light LO and the number of reference lights are not significant as long as the reference light has a wavelength approximate to that of the subject light LO.

Figure 5:
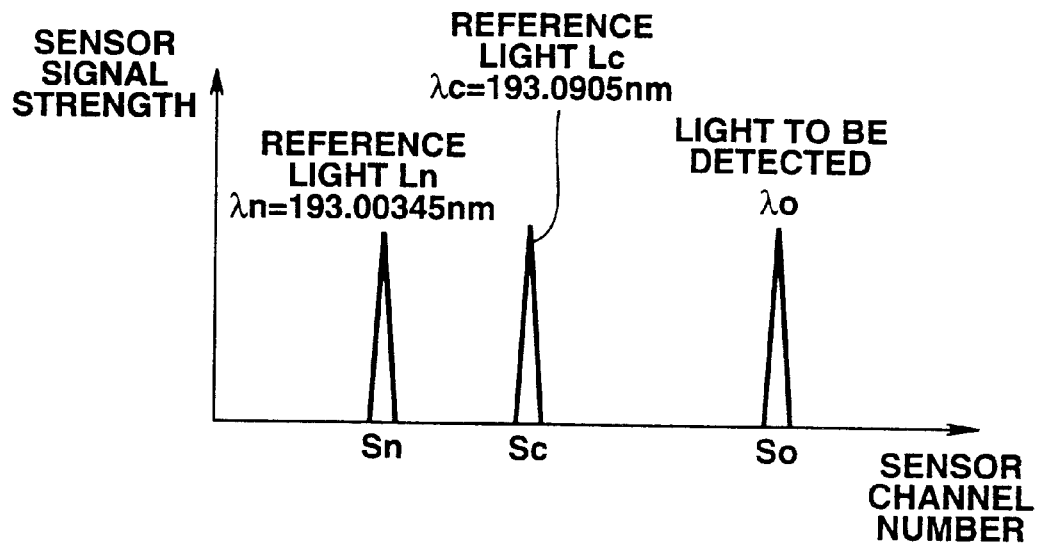
FIG. 5 is a diagram showing a relation between a sensor channel number and a sensor signal strength when a reference light source for outputting emission lines of neon and carbon is used.

As shown in FIG. 5, the emission line Ln (detection channel number Sn of the sensor 10) of neon Ne having a wavelength n=193.00345 nm smaller than that of the subject light LO and the emission line Lc (detection channel number Sc (>Sn) of the sensor 10) of carbon C having a wavelength $\lambda c$=193.0905 nm may be used as the reference lights.

Figure 6:
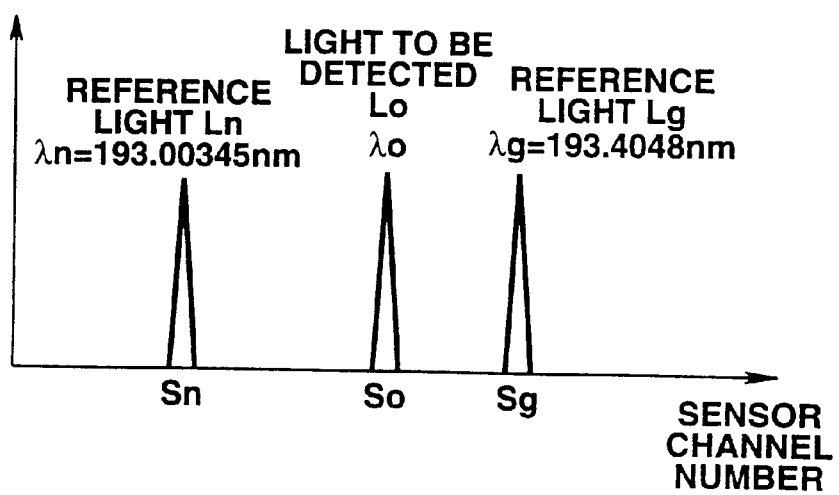
FIG. 6 is a diagram showing a relation between a sensor channel number and a sensor signal strength when a reference light source for outputting emission lines of neon and germanium is used.

As shown in FIG. 6, the emission line Ln (detection channel number Sn of the sensor 10) of neon Ne having a wavelength $\lambda n$=193.00345 nm smaller than that of the subject light LO and emission line Lg (detection channel number Sg of the sensor 10) of germanium Ge having wavelength $\lambda g$=193.4048 nm larger than that of the subject light LO may be used as the reference lights.

Figure 7:
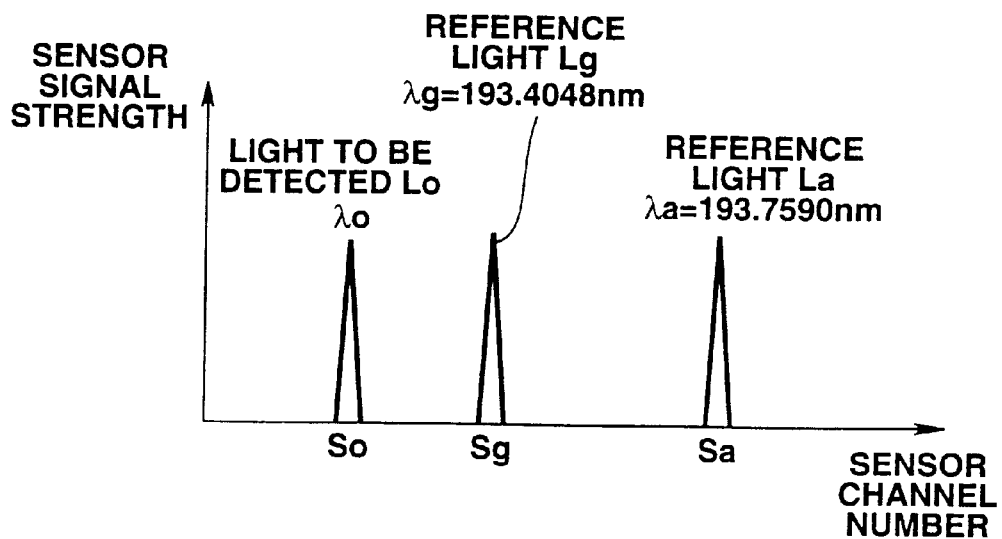
FIG. 7 is a diagram showing a relation between a sensor channel number and a sensor signal strength when a reference light source for outputting emission lines of germanium and arsenic is used.

As shown in FIG. 7, the emission line Lg (detection channel number Sg of the sensor 10) of germanium Ge having a wavelength $\lambda g$=193.4048 nm larger than that of the subject light LO and emission line La (channel number Sa (>Sg) of the sensor 10) of arsenic As having a wavelength $\lambda a$=193.7590 nm may be used as the reference lights.

Figure 8:
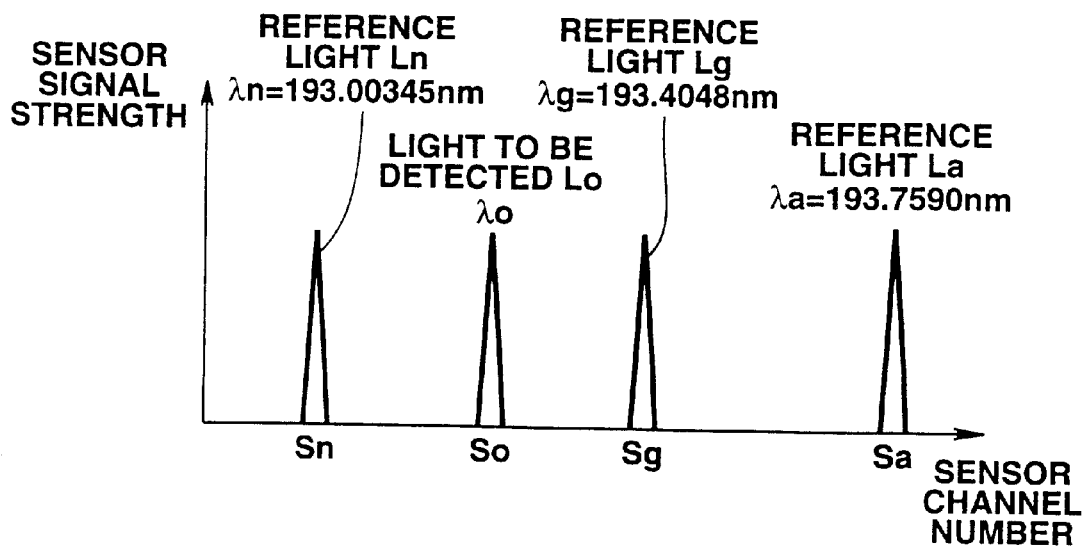
FIG. 8 is a diagram showing a relation between a sensor channel number and a sensor signal strength when a reference light source for outputting emission lines of neon, germanium and arsenic is used.

As shown in FIG. 8, emission line Ln (detection channel number Sn of the sensor 10) of neon Ne having a wavelength $\lambda n$=193.00345 nm smaller than that of the subject light LO, emission line Lg (detection channel number Sg of the sensor 10) of germanium Ge having a wavelength $\lambda g$=193.4048 nm larger than that of the subject light LO and emission line La (channel number Sa of the sensor 10) of arsenic As having a wavelength $\lambda a$=193.7590 nm may be used as three reference lights.

And, arsenic As, neon Ne, germanium Ge and carbon C can be combined as required so to be used for the reference light.

If available, a carbon lamp which emits carbon C as the reference light can be used. For example, when neon Ne and carbon C are combined as shown in FIG. 5, a carbon (C) lamp having neon Ne as the buffer gas can be used as the reference light source 2.

For a combination of neon Ne and germanium Ge shown in FIG. 6, a germanium (Ge) lamp having neon Ne as the buffer gas can be used as the reference light source 2.

For a combination of arsenic As and germanium Ge shown in FIG. 7, a hollow cathode lamp having arsenic As and germanium Ge mixed can be used as the reference light source 2.

For a combination of neon Ne, germanium Ge and arsenic As as shown in FIG. 8, a lamp containing such elements which emit at about 193 nm can be used as the reference light source.

When the three elements are used for the reference light as shown in FIG. 8 to determine dispersion value D of the spectroscope 7 from the aforesaid expression (1) by sequentially selecting two elements, three dispersion values D1, D2, D3 are obtained. In this case, the average value of these three dispersion values D1, D2 and D3 can be decided as the final dispersion value D of the spectroscope 7.

When wavelength $\lambda O$ of the subject light LO exists between wavelengths $\lambda n$ and $\lambda a$ of two reference lights Ln, La as shown in FIG. 2, there is provided an advantage that wavelength $\lambda O$ of the subject light LO can be obtained accurately by interpolation. The reason for this is that the relation between each sensor position of the line sensor 10 and the wavelength is not completely linear. When the wavelength $\lambda O$ of the subject light LO exists outside of between wavelengths $\lambda n$ and $\lambda c$ of the two reference lights Ln, Lc as shown in FIG. 5, the detection accuracy of wavelength $\lambda O$ of the subject light LO is somewhat inferior because it is external insertion.

In the aforesaid embodiment, the arsenic lamp in which neon gas is enclosed as a buffer gas is used as the reference light source 2 to emit two types of reference lights from the single reference light source 2. Besides, the reference lights can also be emitted from separate reference light sources.

Figure 9:
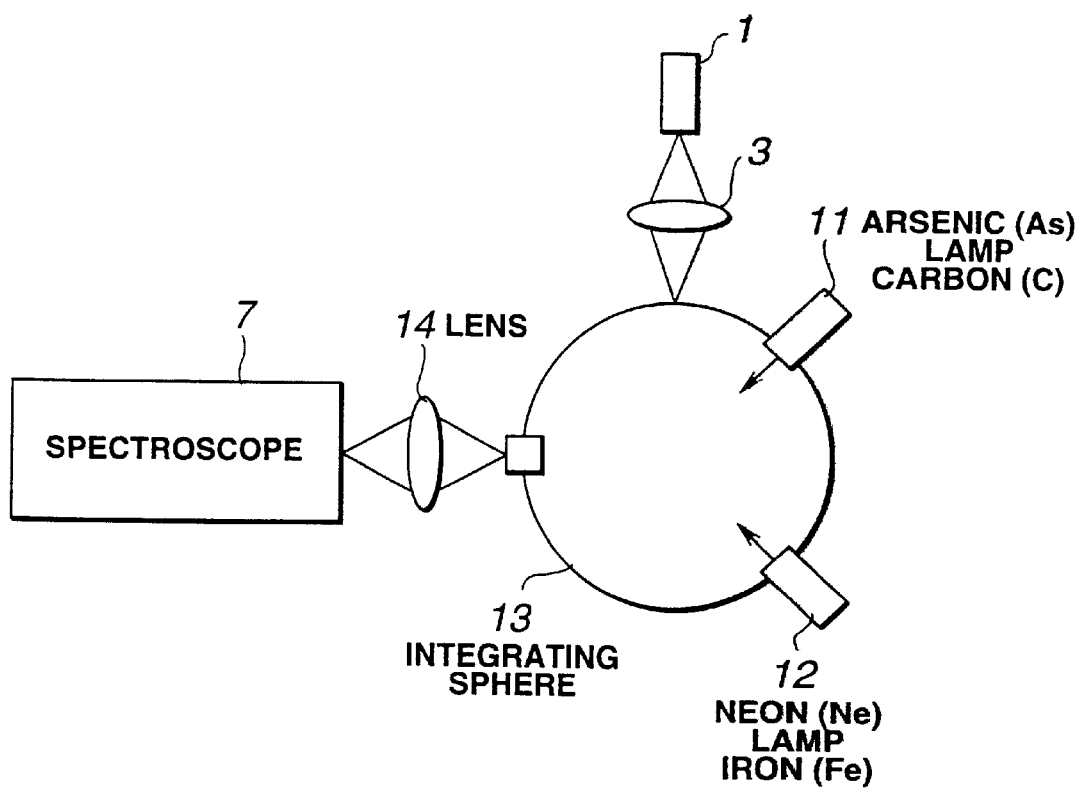
FIG. 9 is a diagram showing an example of structure of the wavelength detector using two reference lamps.

FIG. 9 shows an example of a structure using two reference light sources 11, 12.

As shown in FIG. 9, the arsenic lamp 11 which outputs emission line La of arsenic As having wavelength $\lambda a$=193.7590 nm and neon glow lamp 12 which outputs emission line Ln of neon Ne having wavelength $\lambda n$=193.00345 nm are used as the reference light sources 11, 12, and the lights emitted from the reference light sources 11, 12 are entered integrating sphere 13. Similarly, subject light LO having wavelength $\lambda O$=193.3 nm is emitted from the subject light source 1 and entered the integrating sphere 13 through lens 3. Incidence of the subject light LO and the reference lights La, Ln into the integrating sphere 13 is effected at the same time.

In the integrating sphere 13, the entered lights are reflected irregularly and scattered thoroughly. Therefore, the two reference lights La, Ln and the subject light LO are uniformly mixed in the integrating sphere 13 and entered from the single light source to the spectroscope 7 through the lens 14. Process after the incidence of the light into the spectroscope 7 is the same as in the aforesaid embodiment, and its description is omitted.

The aforesaid two reference lights La, Ln and the subject light LO are preferably entered simultaneously because the characteristic of the spectroscope 7 variable depending on the environment can be measured in real time.

Now, a wavelength detector using a Fabry-Perot etalon spectroscope will be described with reference to FIG. 10 and FIG. 11.

Figure 10:
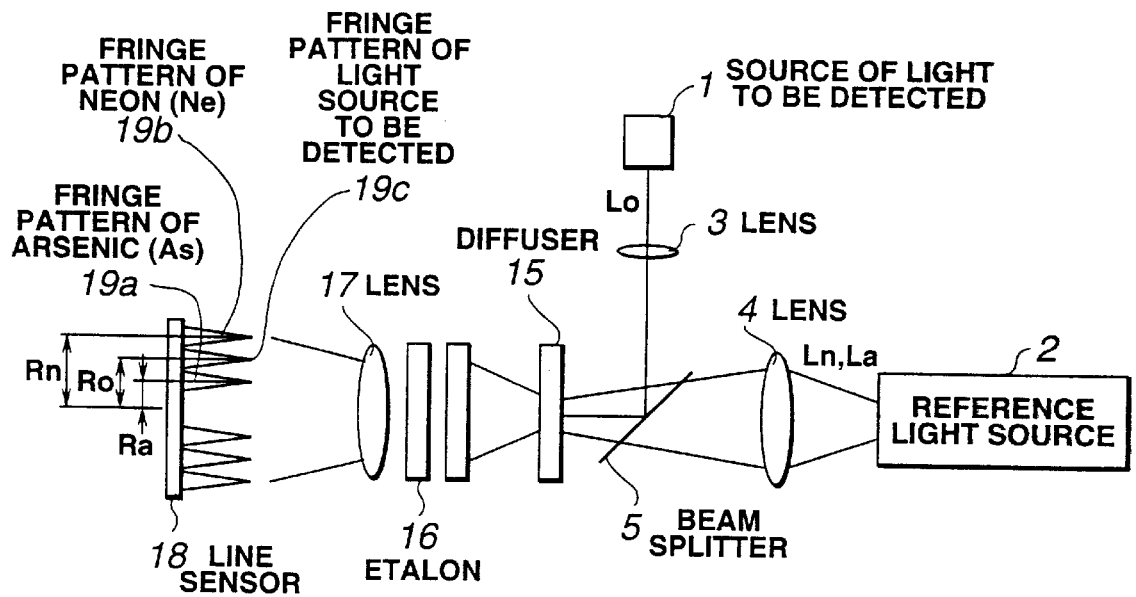
FIG. 10 is a diagram showing an example of structure of the wavelength detector using a Fabry-Perot etalon spectroscope.

In this wavelength detector as shown in FIG. 10, the oscillation laser beam LO as the subject light output from the subject light source 1 is partly reflected by the beam splitter 5 through lens 3 and irradiated to diffuser 15. The subject light LO is scattered from the diffuser 15 and irradiated to etalon 16. Meanwhile, the reference lights Ln (emission line of neon Ne) and La (emission line of arsenic As) output from the reference light source 2 are partly made to permeate by the beam splitter 5 through lens 4, scattered by the diffuser 15 and irradiated to the etalon 16.

The etalon 16 has its inside walls made of two transparent plates which are partial reflection mirrors. The etalon 16 allows the reference lights Ln, La and the subject light Ln each having a different wavelength to permeate therethrough.

The lights having permeated through the etalon 16 are entered converging lens 17. The converging lens 17 is for example an achromatic lens which has its chromatic aberration corrected, and the chromatic aberration is corrected through the achromatism converging lens 17.

Line sensor 18 is set on the focus of the converging lens 17, so that the light having passed through the converging lens 17 is imaged on the line sensor 18. And, fringe pattern 19a corresponding to wavelength $\lambda a$ of the reference light La (arsenic As), fringe pattern 19b corresponding to wavelength $\lambda n$ of the reference light Ln (neon Ne) and fringe pattern 19c corresponding to wavelength $\lambda O$ of the subject light LO are formed on the detection surface of the line sensor 18. These fringe patterns are formed like a concentric circle on the line sensor 18.

The radius of the fringe pattern 19a corresponding to arsenic As from the center location of the line sensor 18 is Ra, the radius of the fringe pattern 19b corresponding to neon Ne is Rn, and the radius of the fringe pattern 10c corresponding to the subject light LO is RO.

The line sensor 18 detects the radii Ra, Rn and RO from the center of the line sensor to the position of each fringe pattern image.

Figure 11:
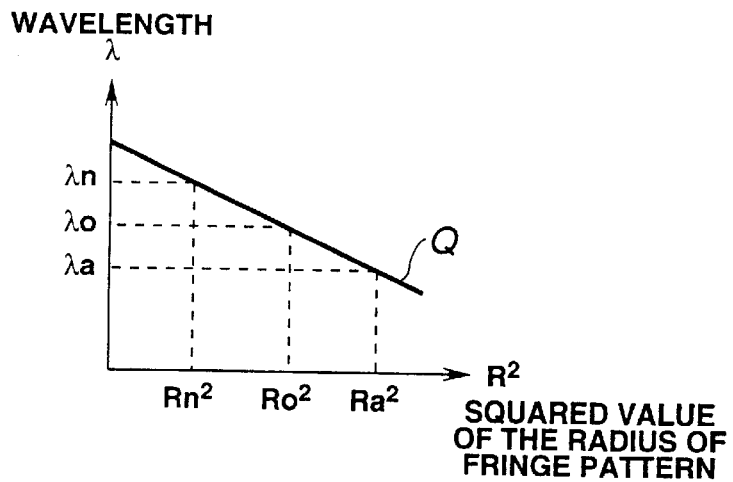
FIG. 11 is a diagram showing a relation between the second power of a radius of a fringe pattern and a wavelength.

As shown in FIG. 11, a relation between the second power $R^2$ of the radius R from center of the line sensor to the fringe pattern image and the wavelength $\lambda$ of the light imaged on the line sensor 18 is theoretically analogous to a linear relation.

Specifically, a relation between the 2nd powers $Rn^2$, $Ra^2$ of the radii of the fringe patterns 19b, 19a of the reference lights Ln, La and the wavelengths $\lambda n$, $\lambda a$ is expressed by a linear function, and its coefficient can be determined. Specifically, the inclination of straight line Q is determined.

Thus, because the position of imaging the fringe pattern 19c of the subject light LO, namely the radius RO of the fringe pattern 19c, is detected by the line sensor 18, the second power $RO^2$ of the radius can be determined, and wavelength $\lambda O$ corresponding to the second power $RO^2$ of the radius can be determined as the wavelength of the subject light LO from the straight line Q shown in FIG. 11.

Though it was described above to determine the oscillation laser beam of the argon fluorine (ArF) excimer laser as the subject light, when the oscillation laser beam of the krypton fluorine (KrF) excimer laser is determined as the subject light LO, the wavelength $\lambda O$ of the subject light LO can be detected in the same way by using the reference light source which outputs an emission line having a wavelength approximate to the wavelength $\lambda O$=248.4 nm. For example, an iron (Fe) lamp which outputs an emission line at a level different from iron (Fe) as the reference light source 2 can be used. Two emission lines having wavelengths of 248.2371 nm and 248.4188 nm are output from the iron (Fe) lamp.

Diffraction grating spectroscope 7″ shown in FIG. 12 may be used instead of the diffraction grating spectroscope 7 shown in FIG. 1.

The emission line of platinum Pt may be used as the reference light though the emission lines of neon Ne, arsenic As, carbon C and germanium Ge are used as the reference lights in the embodiment mentioned above.

A hollow cathode lamp can be used as a light source which outputs the emission line of platinum Pt.

Figure 13:
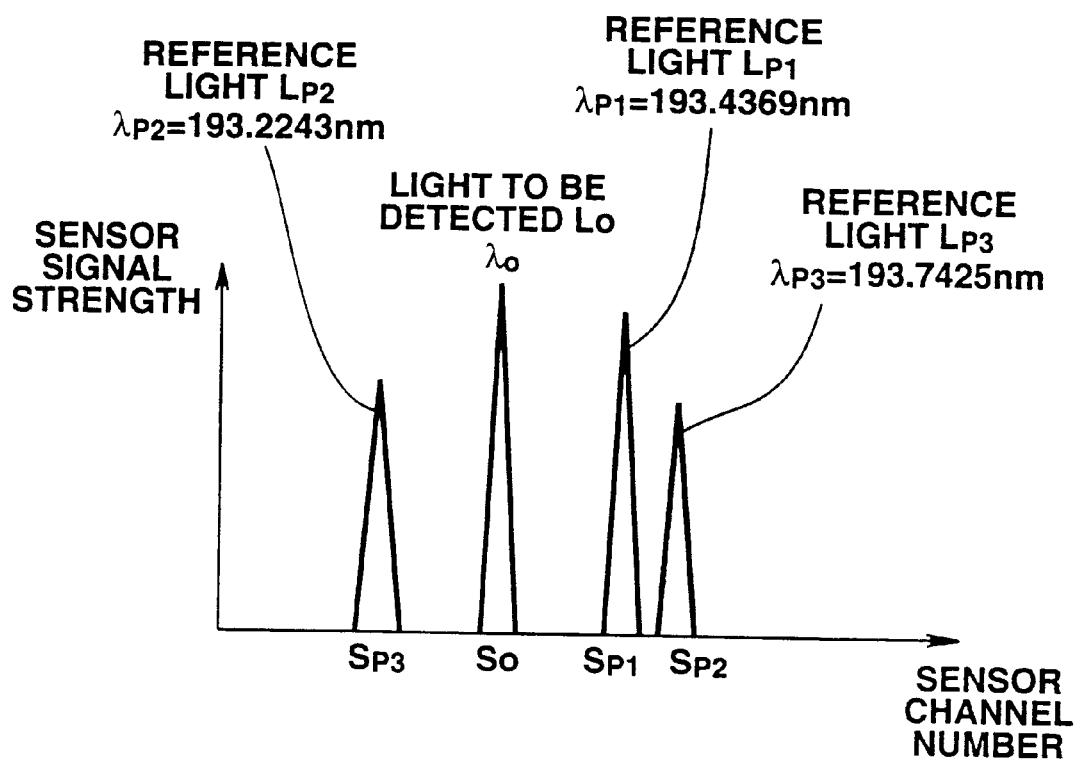
FIG. 13 is a diagram showing a relation between a sensor channel number and a sensor signal strength when a reference light source for outputting an emission line of platinum is used.

As shown in FIG. 13, platinum Pt has three emission lines LP1, LP2, LP3 having different wavelengths.

The wavelengths of the three emission lines LP1, LP2, LP3 output from the platinum lamp are $\lambda P1$=193.4369 nm (channel number SP1 of the sensor 10), $\lambda P2$=193.2243 nm (channel number SP2 of the sensor 10), and $\lambda P3$=193.7425 nm (channel number SP3 of the sensor 10) which are approximate to wavelength, $\lambda O$=193.3 nm of the argon fluorine excimer laser emission line.

Therefore, even one of the three emission lines LP1, LP2 and LP3 can be used as the reference light.

When at least two of the three emission lines LP1, LP2 and LP3 are used as the reference lights, the dispersion value D of the spectroscope 7 can be determined in the same way as the aforesaid embodiment. And, wavelength $\lambda O$ of the subject light LO output from the subject light source 1 can be detected more accurately without an error.

In the aforesaid embodiment, the emission line is used as the reference light to detect the wavelength of the argon fluorine excimer laser, but the wavelength of the argon fluorine excimer laser may be detected by using the absorption line.

Figure 14:
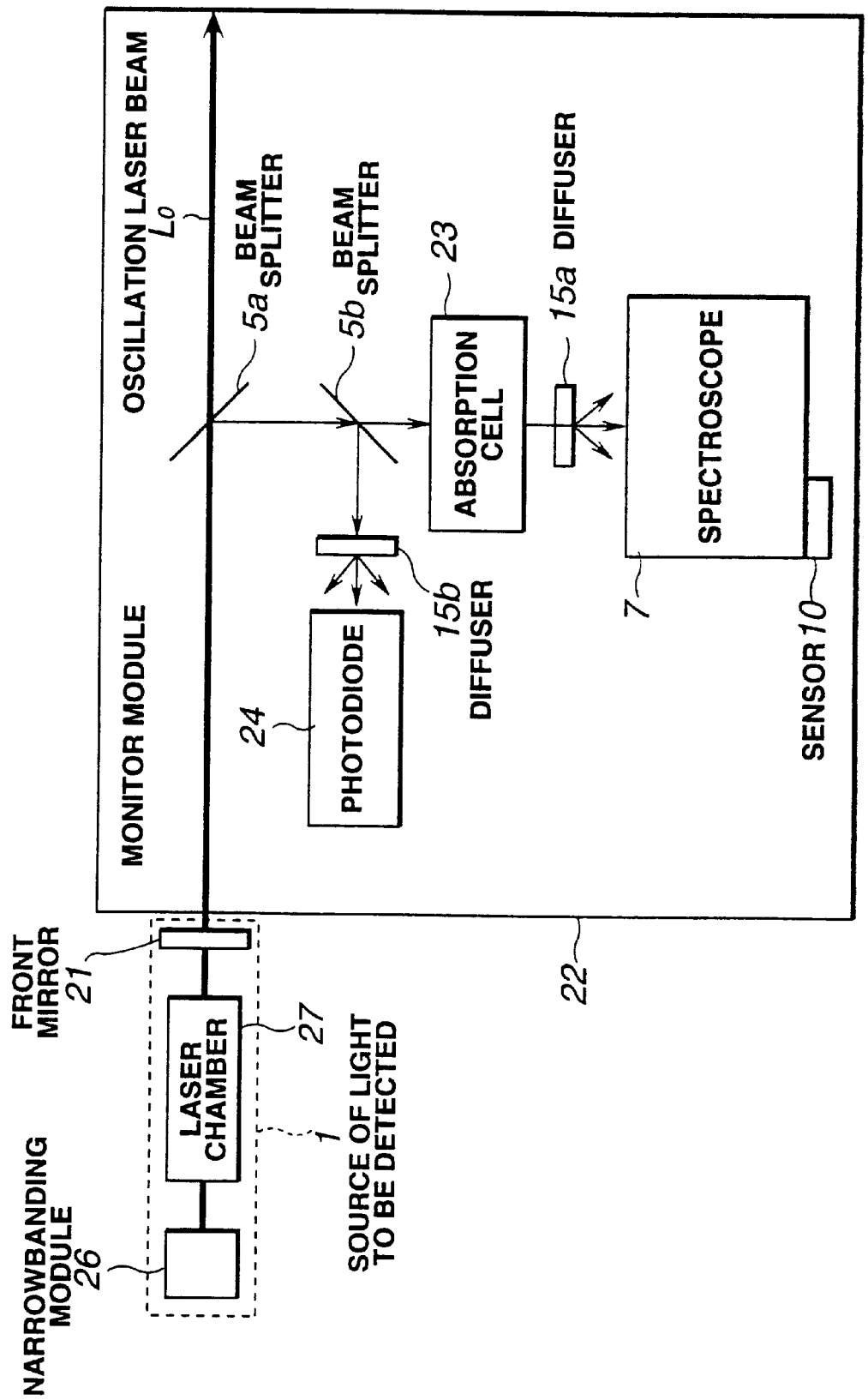
FIG. 14 is a diagram showing a structure of an embodiment of the wavelength detector according to the invention.
Figure 15:
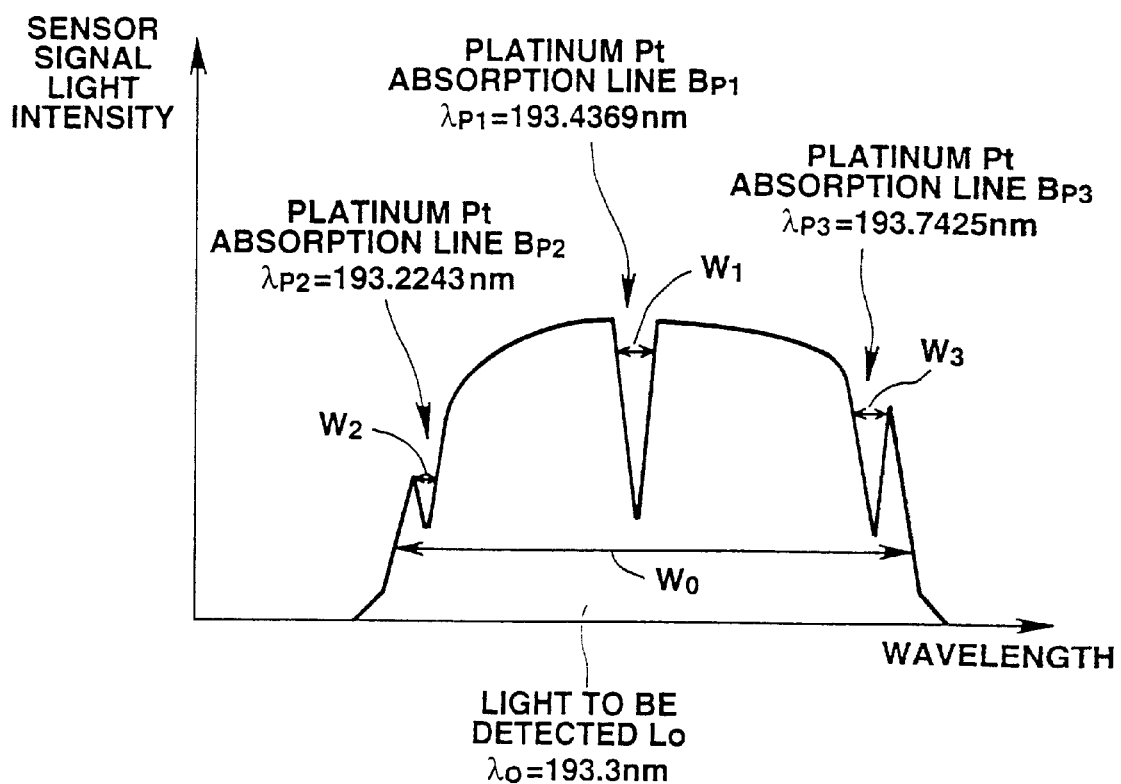
FIG. 15 is a diagram showing a state that light intensity of an emission line of argon fluorine excimer laser is minimized by a plurality of absorption lines having a spectral line width narrower than that of emission line.

FIG. 14 and FIG. 15 are diagrams showing an embodiment of the wavelength detector for detecting the wavelength of the argon fluorine excimer laser by using the absorption line. However, FIG. 15 is a diagram showing an embodiment where the spectral line width of the absorption line is narrower than the spectral line width of the argon fluorine excimer laser.

The oscillation laser beam LO with a predetermined power is irradiated as the subject light LO from the subject light source 1 which is the argon fluorine excimer laser device via front mirror 21.

Meanwhile, the absorption cell 23 has sealed therein vapor gas of platinum Pt having absorption lines BP1, BP2 and BP3 having wavelengths $\lambda P1$=193.4369 nm, $\lambda P2$=193.2243 nm and $\lambda P3$=193.7425 nm as absorption lines to the emission line of the argon fluorine excimer laser.

Here, wavelengths $\lambda P1$, $\lambda P2$, $\lambda P3$ of the absorption lines BP1, BP2, BP3 of platinum Pt gas have the same values as the wavelength values of the emission lines LP1, LP2, LP3 shown in FIG. 13 and are approximate to wavelength $\lambda O$=193.3 nm of the emission line LO of the argon fluorine excimer laser.

Therefore, the wavelength $\lambda O$ of the narrowbanded oscillation laser beam LO is adjusted to the wavelength of at least one of the wavelengths $\lambda P1$, $\lambda P2$, $\lambda P3$ of the absorption lines BP1, BP2, BP3, so that the absolute wavelength of the oscillation laser beam LO can be detected.

In addition to the absorption lines BP1, BP2, BP3 of platinum Pt, the wavelengths of the absorption lines of neon Ne, arsenic As, carbon C and germanium Ge are also approximate to wavelength $\lambda O$=193.3 nm of the emission line LO of the argon fluorine excimer laser.

The wavelengths of the absorption lines of neon Ne, arsenic As, carbon C and germanium Ge have the same values as the wavelength values of the aforesaid emission lines shown in FIG. 2, FIG. 5, FIG. 6, FIG. 7 and FIG. 8.

Therefore, the absolute wavelength of the oscillation laser beam LO can be detected by adjusting the wavelength $\lambda O$ of the narrowbanded oscillation laser beam LO to the wavelength of at least one absorption line among the wavelengths $\lambda a$, $\lambda n$, $\lambda c$, $\lambda g$ of the absorption lines Ba, Bn, Bc, Bg of the aforesaid arsenic As, neon Ne, carbon C and germanium Ge.

The subject light LO is entered beam splitter 5a within the monitor module 22. The subject light LO is partly reflected by the beam splitter 5a and entered beam splitter 5b. The subject light LO is also partly permeated through the beam splitter 5b and entered the absorption cell 23. The rest of the subject light LO reflected and scattered by the beam splitter 5b is irradiated to the diffuser 15b, and its light intensity is detected by photodiode 24. And, the subject light LO having passed through the absorption cell 23 is irradiated to the diffuser 15a. The subject light LO is scattered by the diffuser 15a and entered the spectroscope 7. And, as described above, according to the channel number having detected the light of maximum intensity by the plurality of light-receiving channels on the sensor 10, the detection position of the subject light LO on the line sensor is determined, and the wavelength $\lambda O$ of the subject light LO is determined from the channel number having detected the subject light LO.

FIG. 15 shows a state that the subject light LO of the argon fluorine excimer laser of natural luminescence is permeated through the absorption cell 23 (platinum Pt gas is enclosed), so that the light intensity of the emission line of the subject light LO is minimized by the absorption lines BP1, BP2, BP3 having a spectral line width narrower than that of the emission line LO.

In sealing the platinum Pt gas, a through type hollow cathode lamp may be used.

The sensor 10 is provided with a plurality of light-receiving channels, and a light detection position on the sensor 10 is determined according to the channel number having detected the light of maximum intensity. The sensor 10 can detect a wavelength of the light from the light detection position on the sensor 10 because the incidence position to the sensor 10 is variable depending on the wavelength. Thus, the wavelength of the light is determined from the channel number having detected the light.

Now, it is assumed that platinum Pt is sealed in the absorption cell 23. In this case, the subject light LO having passed through the platinum Pt gas is entered the spectroscope 7 through the diffuser 15$a$, and the light intensity of its spectrum is detected by the channel number SP on the sensor 10.

In this case, absorption lines BP1, BP2, BP3 having spectral line widths W1, W2, W3 narrower than width W0 of the emission line of the subject light LO are included in the width W0 of the emission line of the subject light LO. Specifically, wavelengths $\lambda$P1=193.4369 nm, $\lambda$P2=193.2243 nm and $\lambda$P3=193.7425 nm of platinum Pt are included respectively in the width W0 of the emission line of the subject light LO having a wavelength $\lambda$O=193.3 nm. Therefore, the light intensity of portions corresponding to wavelengths $\lambda$P1=193.4369 nm, $\lambda$P2=193.2243 nm and $\lambda$P3=193.7425 nm in the emission line of the subject light LO is minimized by the absorption lines BP1, BP2, BP3.

And, gas such as arsenic As, neon Ne, carbon C or germanium Ge is sealed in the absorption cell 23.

In this case, absorption lines Ba, Bn, Bc, Bg having a spectral line width narrower than width W0 of the emission line of the subject light LO are also included in the width W0 of the emission line of the subject light LO. Specifically, wavelength $\lambda$a=193.7590 nm of arsenic As, wavelength $\lambda$n=193.00345 nm of neon Ne, wavelength $\lambda$c=193.0905 nm of carbon C and wavelength $\lambda$g=193.4048 nm of germanium Ge are included in the width W0 of the emission line of the subject light LO having wavelength $\lambda$O=193.3 nm. Therefore, the light intensity of the portions corresponding to wavelengths $\lambda$a=193.7590 nm, $\lambda$n=193.00345 nm, $\lambda$c=193.0905 nm and $\lambda$g=193.4048 nm of the emission line of the subject light LO is minimized by the absorption lines Ba, Bn, Bc, Bg.

Figure 16:
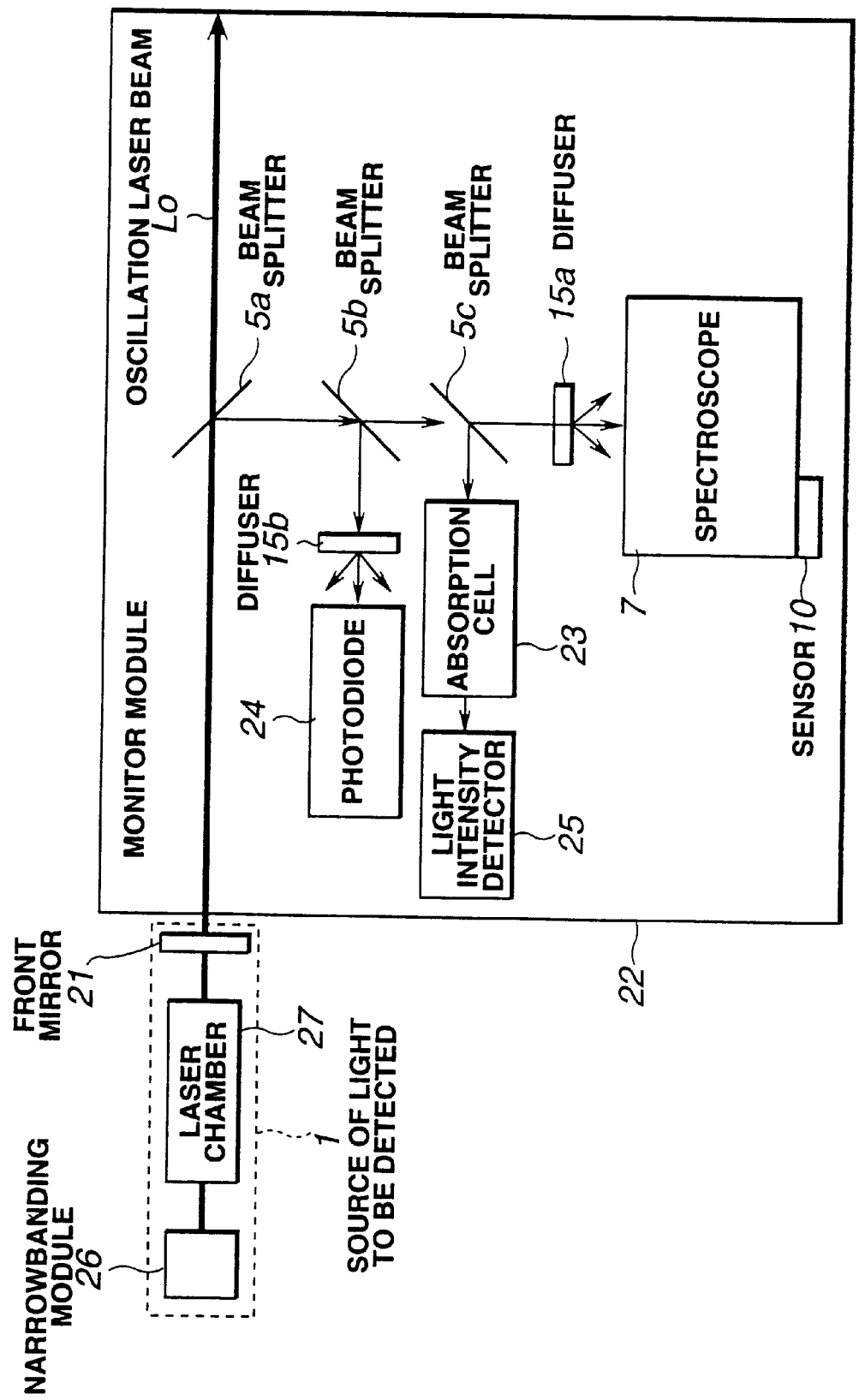
FIG. 16 is a diagram showing a modification of the embodiment of the wavelength detector shown in FIG. 15.

FIG. 16 is a diagram showing an embodiment in that the spectral line width of the absorption line is wider than the spectral line width of the argon fluorine excimer laser.

In this case, the oscillation laser beam LO of a predetermined power is emitted as the subject light LO from the subject light source 1, which is the argon fluorine excimer laser device, via front mirror 21.

And, the subject light LO is entered the beam splitter 5$a$ within the monitor module 22. The subject light LO is partly reflected by the beam splitter 5$a$ and entered the beam splitter 5$b$. The subject light is also partly permeated through the beam splitter 5$b$ and entered beam splitter 5$c$. And, the rest of the subject light LO reflected by the beam splitter 5$b$ is irradiated to diffuser 15$b$ and scattered, and its light intensity is detected by photodiode 24. Part of the subject light LO is reflected by the beam splitter 5$c$ and entered absorption cell 23. And, the subject light LO permeates through the absorption cell 23, and its light intensity is detected by light intensity detector 25.

Meanwhile, the part of the subject light LO having permeated through the beam splitter 5$c$ is irradiated to the diffuser 15$a$. The subject light LO is scattered by the diffuser 15$a$ and entered the spectroscope 7. And, as described above, wavelength $\lambda$O of the subject light LO is determined from the channel number having detected the light intensity of the subject light LO on the sensor 10.

Figure 17:
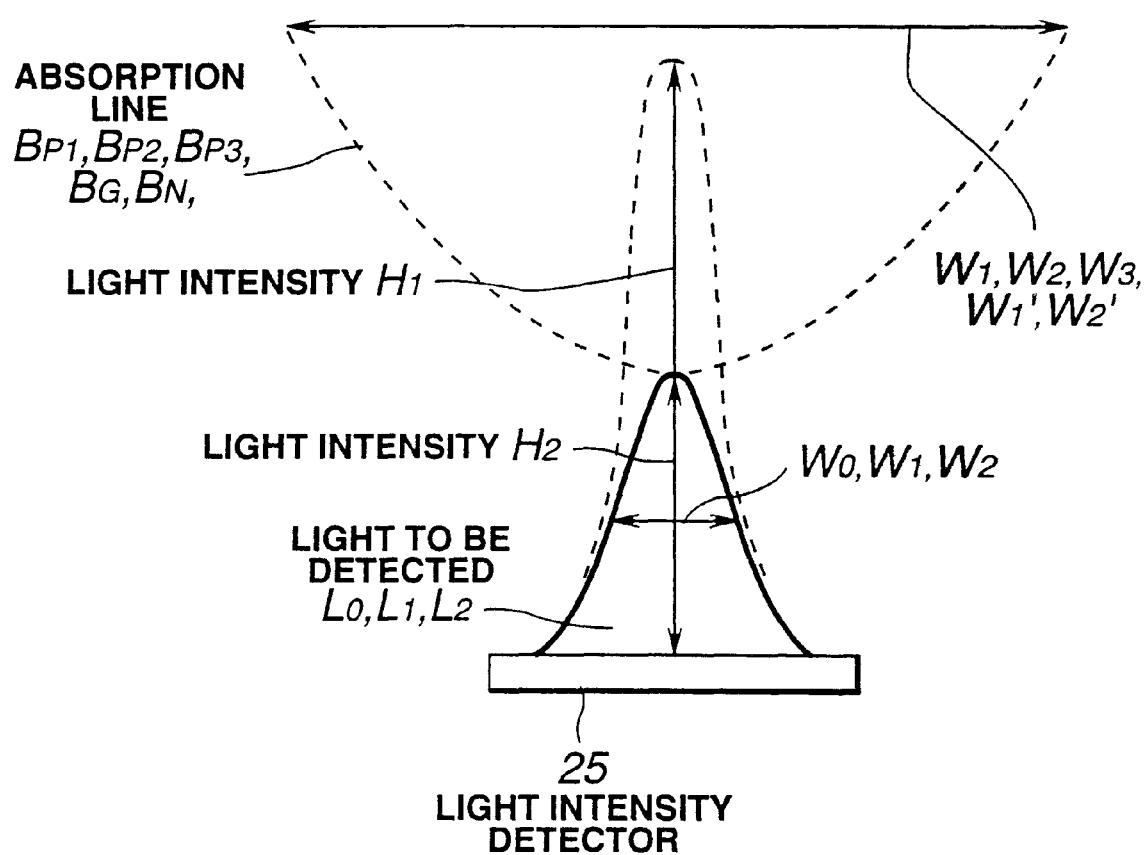
FIG. 17 is a diagram showing a state that light intensity of an emission line of an argon fluorine excimer laser or fluorine molecule F2 laser is minimized by a plurality of absorption lines having a spectral line width wider than that of an emission line.

FIG. 17 shows that the light intensity of the emission line of the subject light LO is minimized by absorption line BP1, BP2 or BP3 having a spectral line width wider than that of the emission line LO by penetrating the subject light LO of the argon fluorine excimer laser through the absorption cell 23 (platinum Pt gas sealed therein).

The light intensity detector 25 can be any type as long as it can detect the light intensity. For example, it is a photodiode, a photomultiplier tube or the like.

Now, it is assumed that platinum Pt gas is sealed in the absorption cell 23. And, light intensity of the subject light LO is detected by a light-receiving channel on the light intensity detector 25 after passing the subject light LO through the platinum Pt gas.

At this time, the emission line of the subject light LO is changed from light intensity H1 to minimum light intensity H2 by the absorption line having spectral line width W1, W2 or W3 wider than the emission line width W0 of the subject light LO.

For example, it is assumed that the absorption cell 23 has sealed therein gas such as arsenic As, neon Ne, carbon C or germanium Ge. In this case, the light intensity of the subject light LO is detected by the light-receiving channel on the light intensity detector 25 after passing the subject light LO through the arsenic As gas, neon Ne gas, carbon C gas or germanium Ge gas. And, the emission line of the subject light LO is changed from light intensity H1 to minimum light intensity H2 by the absorption line of arsenic As, neon Ne, carbon C or germanium Ge having a spectral line width wider than the emission line width W0 of the subject light LO.

Now, with reference to a case of having platinum Pt gas sealed in the absorption cell 23, a process of detecting a wavelength of the oscillation laser beam LO using three absorption lines BP1, BP2, BP3 of platinum Pt having a spectral line width narrower than the emission line width of the argon fluorine excimer laser will be described with reference to FIG. 14, FIG. 18 and FIG. 19.

FIG. 18($a$) is a flowchart of controlling a wavelength of the oscillation laser beam LO using an absorption line, and FIG. 18($b$) is a diagram showing a relation between oscillating wavelength $\lambda$O and light intensity.

Figure 21:
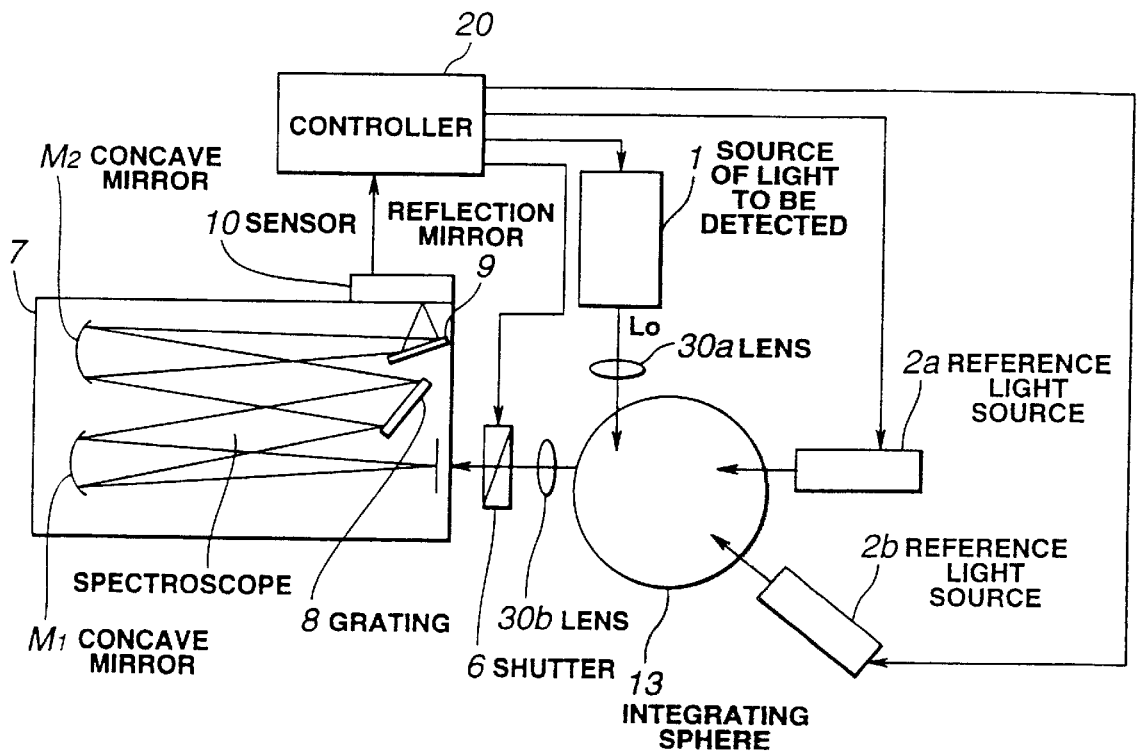
FIG. 21 is a diagram showing an example of a structure of the wavelength detector using a diffraction grating type spectroscope.

Referring to the flowchart of FIG. 18($a$), the controller 20 shown in FIG. 21 performs a wavelength-calibrating subroutine to fix central wavelength $\lambda$O of the spectrum of the oscillation laser beam LO on the basis of the externally instructed signal to a target wavelength (step 200).

The performance of the wavelength-calibrating subroutine emits the oscillating wavelength $\lambda$O of the oscillation laser beam LO having a predetermined initial wavelength (step 201).

In the monitor module 22 shown in FIG. 14, the light intensity of the oscillation laser beam LO, which has permeated through the absorption cell 23 having platinum Pt gas sealed therein and passed through the diffuser 15$a$ and the spectroscope 7, is determined by the sensor 10. At this time, the light detection position on the sensor 10 is determined according to the channel number having detected the light of maximum intensity. But, the channel number on the sensor 10 for detecting the light intensity of the spectrum of the oscillation laser beam varies depending on a change in the oscillating wavelength $\lambda$O (step 202).

Then, the oscillating wavelength $\lambda$O of the oscillation laser beam LO is changed from the initial wavelength by only a predetermined degree by the controller 20. Thus, minimum points Z2, Z1, Z3 having a minimum light intensity of the spectrum of the oscillation laser beam LO are sequentially searched (step 203).

And, it is judged whether the oscillating wavelength λO has become a calibration-completed wavelength (step 204).

When it is judged that the oscillating wavelength λO of the oscillation laser beam LO is not a calibration-completed wavelength (judgment NO in step 204), the procedure is returned to steps 202 and 203 to further change the oscillating wavelength λO of the oscillation laser beam LO by a predetermined degree. Meanwhile, when the oscillating wavelength λO of the oscillation laser beam LO has become a calibration-completed wavelength (judgment YES in step 204), data d of a relation between the oscillating wavelength λO and the light intensity is plotted as shown in FIG. 18(b) (step 205).

Figure 18A:
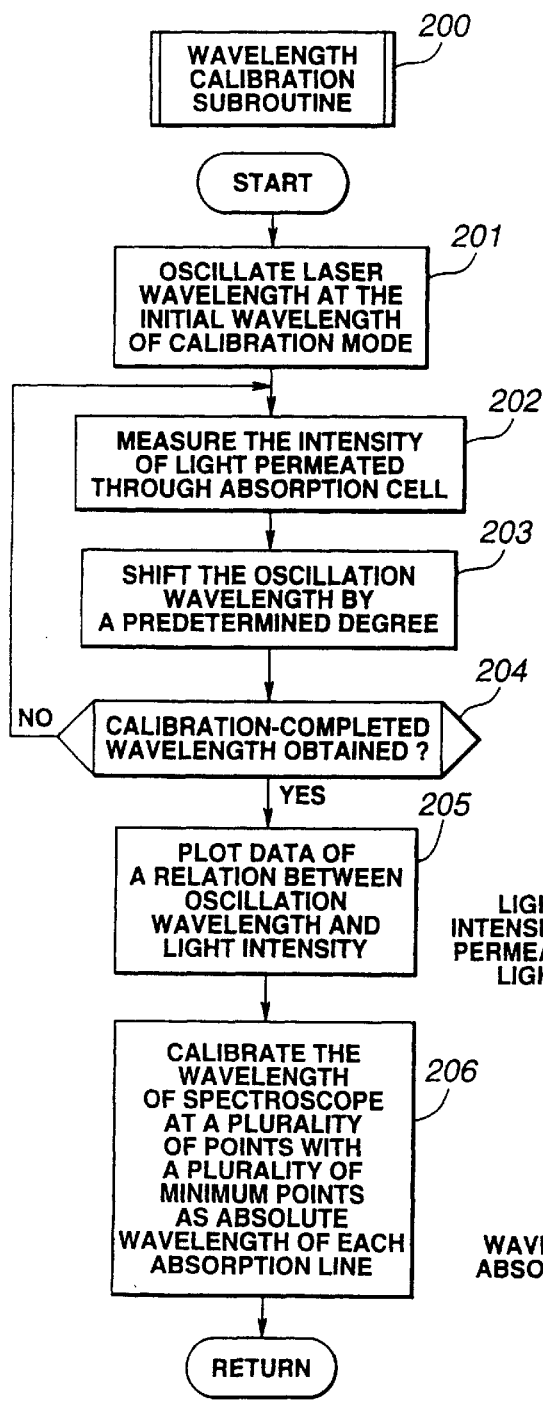
FIG. 18($a$) is a diagram showing a flowchart of controlling the wavelength of an oscillation laser beam using the absorption lines, and FIG. 18($b$) is a diagram showing a relation between an oscillating wavelength and light intensity.
Figure 18B:
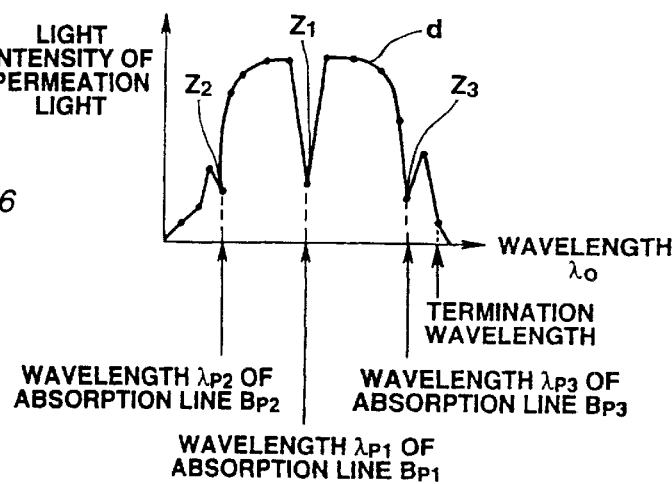

And, as indicated by points Z1, Z2, Z3 in data d of FIG. 18(b), the light intensity of the spectrum of the oscillation laser beam LO detected on the sensor 10 is minimized by absorption lines BP1, BP2, BP3. Because the wavelengths of the minimum points Z1, Z2, Z3 are wavelengths λP1=193.4369 nm, λP2=193.2243 nm and λP3=193.7425 nm of the absorption lines BP1, BP2, BP3, the central wavelength λO of the spectrum of the oscillation laser beam LO having entered light-receiving channels Sz1, Sz2, Sz3 on the sensor 10 corresponding to the positions of the minimum points Z1, Z2, Z3 are calibrated by wavelengths λP1=193.4369 nm, λP2=193.2243 nm and λP3=193.7425 nm of the absorption lines BP1, BP2, BP3. Thus, the light-receiving channels Sz1, Sz2, Sz3 on the sensor 10 corresponding to the positions of the minimum points Z1, Z2, Z3 are clarified. And, a difference of wavelength difference between the light-receiving channels on the sensor 10 is determined from a distance between the spectroscope 7 and the sensor 10 and the characteristic of the lens and can be indicated by constant δ. Therefore, wavelength λO of an unknown oscillation laser beam LO whose light intensity is detected on the sensor 10 can be determined by any of the following expressions (12), (13), (14) by using the wavelengths λP1=193.4369 nm, λP2=193.2243 nm and λP3=193.7425 nm of the absorption lines BP1, BP2 and BP3, channel numbers X1, X2, X3 between the light-receiving channels Sz1, Sz2, Sz3 and light-receiving channel SP where the wavelength λO of the unknown oscillation laser beam LO is detected, and the constant δ.

$$\lambda O1 = 193.4369 \pm X1 \times \delta \quad (12)$$

$$\lambda O2 = 193.2243 \pm X2 \times \delta \quad (13)$$

$$\lambda O3 = 193.7425 \pm X3 \times \delta \quad (14)$$

And, the average value of the three wavelengths λO1, λO2, λO3 determined from the aforesaid expressions can be determined as the wavelength λO of the final unknown oscillation laser beam LO. Besides, because two or more absorption lines are used, dispersion value D of the spectroscope 7 can be determined in the same way as in the embodiment using the above-mentioned two or more reference lights (step 206).

Now, a process of detecting a wavelength of the oscillation laser beam LO using absorption lines BP1, BP2, BP3 of platinum Pt having a spectral line width wider than the emission line width of the argon fluorine excimer laser will be described with reference to FIG. 16, FIG. 18 and FIG. 19.

First, the process of steps 200 to 201 shown in the aforesaid FIG. 18(a) is performed.

Then, in the monitor module 22 shown in FIG. 16, the light intensity of the spectrum of the oscillation laser beam LO having permeated through the absorption cell 23 in which platinum Pt gas is sealed is detected on the light intensity detector 25 (step 202).

Figure 19:
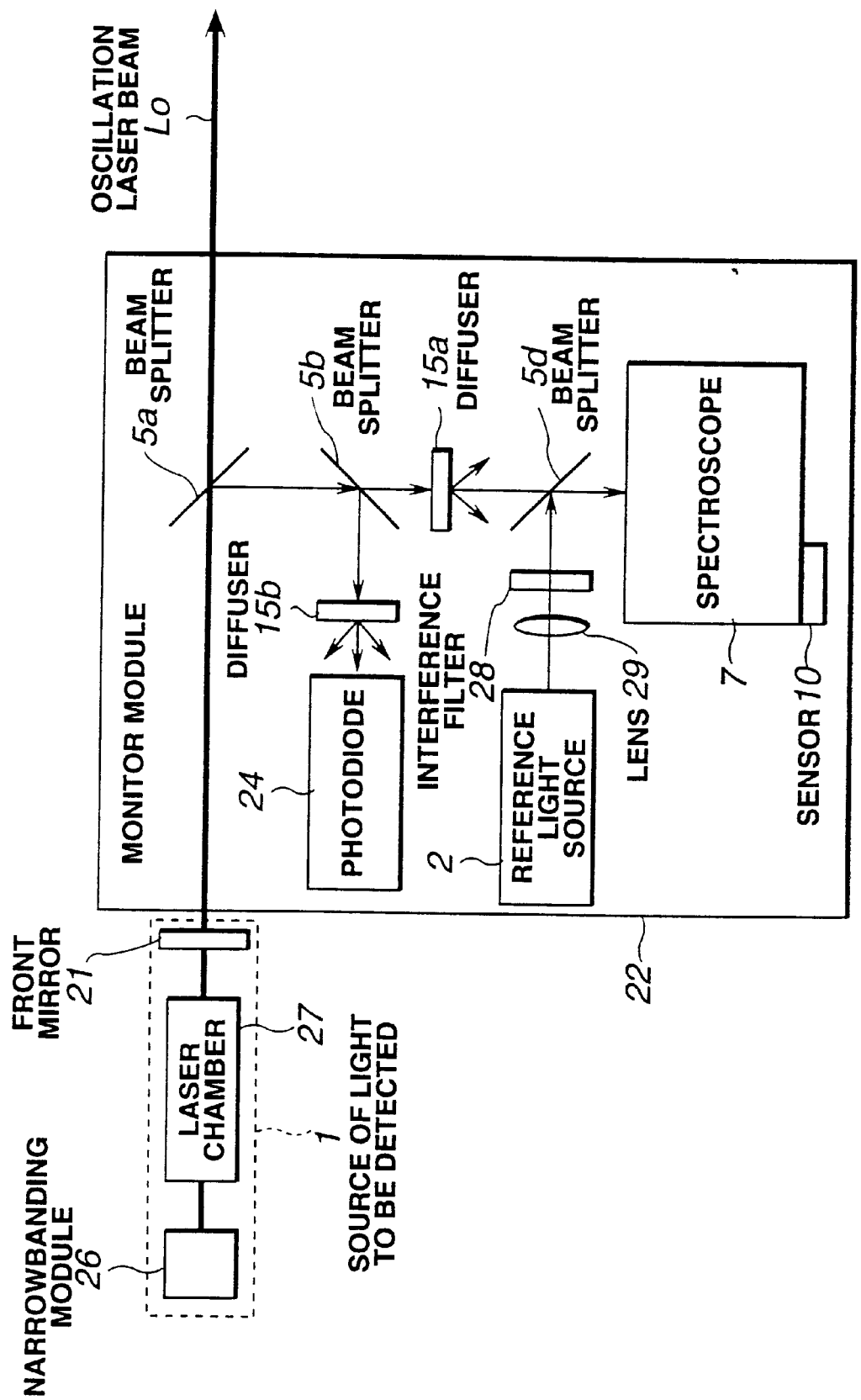
FIG. 19 is a diagram showing a structure of the embodiment of the wavelength detector according to the invention.

Then, oscillating wavelength λO of the oscillation laser beam LO is changed from the initial wavelength by a predetermined degree by the controller 20 shown in FIG. 19. Thus, a minimum point where the light intensity of the spectrum of the oscillation laser beam LO detected on the light intensity detector 25 becomes minimum is searched (step 203).

Subsequently, steps 204 to 205 shown in FIG. 18(a) are performed.

As a result, when the light intensity of the spectrum of the oscillation laser beam LO detected on the light intensity detector 25 is minimized by the absorption lines BP1, BP2, BP3 in step 203, the oscillating wavelength λO of the oscillation laser beam LO, which is entered the light-receiving channels Sz1, Sz2, Sz3 on the sensor 10, becomes wavelengths λP1, λP2, λP3 of the absorption lines BP1, BP2, BP3. Therefore, wavelength λO of an unknown oscillation laser beam LO whose light intensity is detected on the sensor 10 can be determined as wavelength λO of the final unknown oscillation laser beam LO in the same way from the aforesaid expressions (12), (13), (14) by using the wavelengths λ1=193.4369 nm, λP2=193.2243 nm and λP3=193.7425 nm of the absorption lines BP1, BP2, BP3, the channel numbers X1, X2, X3 between the light-receiving channels Sz1, Sz2, Sz3 and the light-receiving channel SP for detecting the wavelength λO of the unknown oscillation laser beam LO and the aforesaid constant δ (step 206).

When the wavelength λO of the unknown oscillation laser beam LO is determined, one or two of the three absorption lines BP1, BP2, BP3 of platinum Pt may be used.

However, two or more absorption lines can be used among the three absorption lines BP1, BP2, BP3 as in the aforesaid embodiment to determine dispersion value D of the spectroscope 7, and the wavelength λO of the subject light LO output from the subject light source 1 can be detected more accurately without an error.

As described above, to detect wavelength λO=193.3 nm of the oscillation laser beam LO for the argon fluorine excimer laser, at least one absorption line is used among the absorption lines of platinum Pt, arsenic As, neon Ne, carbon C and germanium Ge as the absorption line to the argon fluorine excimer laser emission line.

Thus, even if the characteristic of the spectroscope 7 is varied due to an individual difference among the spectroscopes 7 or a change in the measurement environment, wavelength λO of the subject light LO output from the subject light source 1 can be detected accurately without an error.

FIG. 19 is a diagram showing an embodiment in that when the subject light is a fluorine molecule F2 laser, a change in the central wavelength λO of the spectrum of the oscillation laser beam LO is prevented during exposing by using the reference light.

The subject light source 1 is a light source, which emits subject light LO whose wavelength is to be detected, and is a fluorine molecule F2 laser device in this embodiment. A laser beam, which is oscillated by being excited by electrical discharge in a laser chamber of the fluorine molecule F2 laser device, is reciprocally moved within a resonator comprising front mirror 21 and narrowbanding module 26 so to be amplified and emitted as the oscillation laser beam LO of a predetermined power from the front mirror 21.

Meanwhile, the reference light source 2 is a hollow cathode lamp in which carbon C, iron Fe, sodium Na, fluorine F, magnesium Mg, aluminum Al, argon Ar, calcium Ca, scandium Sc, chromium Cr, manganese Mn, nickel Ni, copper Cu, germanium Ge, arsenic As, bromine Br or platinum Pt gas is sealed. Therefore, the emission lines of such elements are emitted from the reference light source 2.

Wavelengths of the emission lines of the aforesaid elements are shown in the following table.

| Element | Wavelength | Light intensity | Atomic weight |
|---|---|---|---|
| C | 156.1438 | 1000 | 6.00 |
|  | 156.1367 | 400 | 6.00 |
|  | 156.1341 | 400 | 6.00 |
|  | 156.0683 | 500 | 6.00 |
|  | 156.0310 | 250 | 6.00 |
|  | 157.6480 | 300 | 6.02 |
| F | 156.5539 | 250 | 9.02 |
|  | 156.3726 | 250 | 9.02 |
| Na | 157.9117 | 400 | 11.02 |
|  | 157.7900 | 450 | 11.02 |
|  | 156.5294 | 500 | 11.02 |
|  | 156.2870 | 550 | 11.02 |
| Mg | 157.2712 | 400 | 12.02 |
| Al | 156.4164 | 700 | 13.03 |
|  | 157.7900 | 300 | 13.04 |
| Ar | 157.8812 | 300 | 18.01 |
|  | 157.6898 | 300 | 18.01 |
|  | 157.5815 | 300 | 18.01 |
|  | 157.4993 | 600 | 18.01 |
|  | 156.7987 | 400 | 18.01 |
|  | 156.0191 | 400 | 18.01 |
| Ca | 157.1268 | 650 | 20.02 |
|  | 156.2473 | 900 | 20.02 |
| Sc | 157.4923 | 450 | 21.03 |
|  | 156.3811 | 360 | 21.03 |
| Cr | 157.1055 | 250 | 24.02 |
|  | 157.9696 | 1000 | 24.04 |
| Mn | 157.7180 | 350 | 25.03 |
|  | 157.8300 | 450 | 25.04 |
|  | 157.5968 | 900 | 25.04 |
|  | 157.0261 | 600 | 25.04 |
|  | 156.8861 | 450 | 25.04 |
| Fe | 157.2841 | 300 | 26.02 |
|  | 157.9368 | 375 | 26.03 |
|  | 157.8743 | 375 | 26.03 |
| Pt | 156.89021 | 1100 | 195.09 |
|  | 156.892 | 1100 | 195.09 |
|  | 157.31802 | 1100 | 195.09 |
|  | 157.38180 | 1700 | 195.09 |
|  | 157.43059 | 8200 | 195.09 |
|  | 157.94357 | 3200 | 195.09 |
|  | 158.13980 | 3700 | 195.09 |
|  | 158.36406 | 520 | 195.09 |
| Fe | 157.7758 | 450 | 26.03 |
|  | 157.7205 | 450 | 26.03 |
|  | 157.5409 | 250 | 26.03 |
|  | 157.5190 | 300 | 26.03 |
|  | 157.4602 | 250 | 26.03 |
|  | 157.1245 | 450 | 26.03 |
|  | 157.0418 | 450 | 26.03 |
|  | 157.0178 | 450 | 26.03 |
|  | 156.9221 | 375 | 26.03 |
|  | 156.8711 | 375 | 26.03 |
|  | 156.8274 | 600 | 26.03 |
|  | 156.7955 | 375 | 26.03 |
|  | 156.6747 | 250 | 26.03 |
|  | 156.6572 | 300 | 26.03 |
|  | 156.6256 | 520 | 26.03 |
|  | 156.5867 | 250 | 26.03 |
|  | 156.4780 | 300 | 26.03 |
|  | 156.4263 | 300 | 26.03 |
|  | 156.3579 | 375 | 26.03 |
|  | 156.2753 | 375 | 26.03 |
|  | 156.2458 | 450 | 26.03 |
|  | 156.2259 | 375 | 26.03 |
|  | 156.1355 | 375 | 26.03 |
|  | 156.1193 | 375 | 26.03 |
|  | 156.0272 | 375 | 26.03 |
| Ni | 156.9913 | 260 | 28.03 |
|  | 156.6998 | 460 | 28.03 |
|  | 156.0177 | 670 | 28.03 |

-continued

| Element | Wavelength | Light intensity | Atomic weight |
|---|---|---|---|
| Cu | 156.8347 | 270 | 29.03 |
|  | 156.7353 | 910 | 29.03 |
|  | 156.5776 | 250 | 29.03 |
|  | 156.0762 | 460 | 29.03 |
| Ge | 157.6855 | 500 | 32.01 |
| As | 157.0993 | 500 | 33.01 |
| Br | 157.6387 | 660 | 35.00 |
|  | 157.4841 | 730 | 35.00 |

Two types or more of reference lights may be emitted from the reference light source 2 by properly combining two or more kinds of elements among the aforesaid elements.

And, the wavelengths of the emission lines of the aforesaid elements are approximate to the wavelength of the emission line of the fluorine molecular F2 laser, so that even only one of the emission lines of the aforesaid elements can be used as the reference light. Therefore, one type of reference light may be emitted from the reference light source 2.

The subject light LO is entered beam splitter 5a in the monitor module 22. The subject light LO is partly reflected by the beam splitter 5a and entered the beam splitter 5b. The subject light LO is also partly permeated through the beam splitter 5b and irradiated to the diffuser 15a. And, the rest of the subject light LO reflected by beam splitter 9b is irradiated to the diffuser 15b and scattered, and its light intensity is detected by the photodiode 24. The subject light LO is scattered from the diffuser 15a and irradiated to beam splitter 5d. Then, the subject light LO is partly permeated through the beam splitter 5d and entered the spectroscope 7. The reference light is entered the beam splitter 5d through lens 29 and interference filter 28. The reference light is partly reflected by the beam splitter 5d and entered the spectroscope 7.

For the reference light source 2 of this embodiment, two hollow cathode lamps of for example carbon C and iron Fe are used as reference light sources 2a, 2b. Thus, emission line LC of carbon C having wavelength $\lambda C=157.6480$ nm and emission line Le of iron Fe having wavelength $\lambda e=157.5190$ nm are emitted from the reference light sources 2a, 2b as reference lights LC, Le having different wavelengths.

As shown in FIG. 9, as reference light source 11, 12, carbon lamp 11 which emits the emission line LC of carbon C having wavelength $\lambda C=157.6480$ nm and iron lamp 12 which emits emission line Le of iron Fe having wavelength $\lambda e=157.5190$ nm are provided, and the lights emitted from the reference light sources 11, 12 are entered the integrating sphere 13. L Similarly, the subject light LO having wavelength $\lambda O=157.6299$ nm is emitted from the subject light source 1 and entered the integrating sphere 13 through the lens 3. The subject light LO and the reference lights LC, Le are entered the integrating sphere 13 at the same time.

In the integrating sphere 13, the entered lights are reflected diffusely and scattered uniformly. Therefore, the two reference lights LC, Le and the subject light LO are uniformly combined in the integrating sphere 13 and entered the spectroscope 7 from the single light source through the lens 14.

The aforesaid two reference lights LC, Le and the subject light LO are desirably entered at the same time, because the characteristic of the spectroscope 7 variable depending on the environment can be measured in real time.

Now, a spectroscope applied in this embodiment will be described.

FIG. 21 is a diagram showing an embodiment in that the spectroscope 7 is a diffraction grating type.

Reference lights LC, Le output from integrating sphere 13 are led to shutter 6 through lens 30b. Thus, the subject light LO and the reference lights LC, Le are passed through the shutter 6 and entered the spectroscope 7.

The subject light LO and the reference lights LC, Le entered the spectroscope 7 are led to the sensor 10 as described above.

Respective wavelengths $\lambda O$, $\lambda C$, $\lambda e$ of the subject light LO and the reference lights LC, Le entered the spectroscope 7 are detected according to detection positions on the sensor 10 as described above.

In this embodiment, it is assumed that the halogen molecular laser device of the subject light source 1 is used as a light source for a stepper (reduction projection exposure device). In this case, it is necessary to make the oscillation laser beam LO of the halogen molecular laser have a narrow band. Besides, it is also necessary to control to stabilize with high accuracy to prevent the central wavelength of the spectrum of the oscillation laser beam LO having a narrow band from being deviated during exposing.

Figure 34:
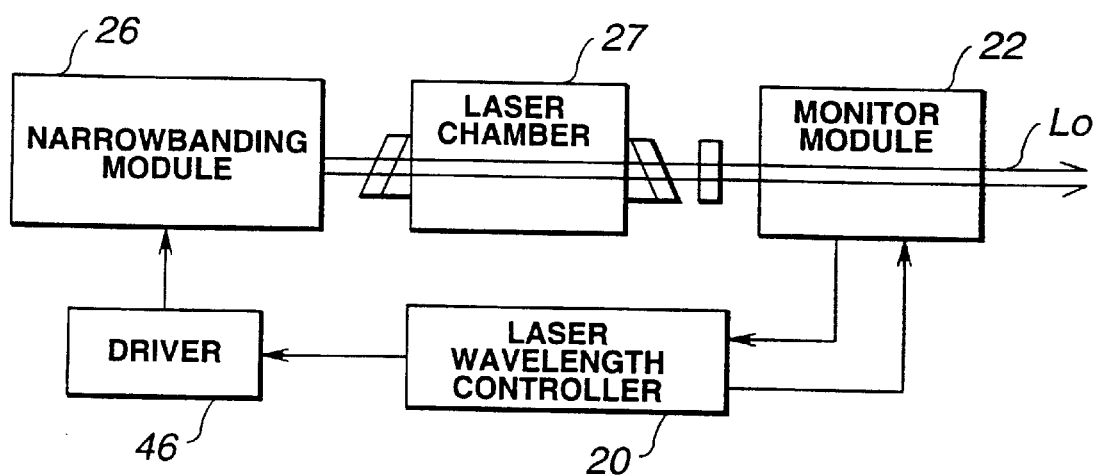
FIG. 34 is a diagram showing a general laser wavelength stabilization controlling device.
Figure 35:
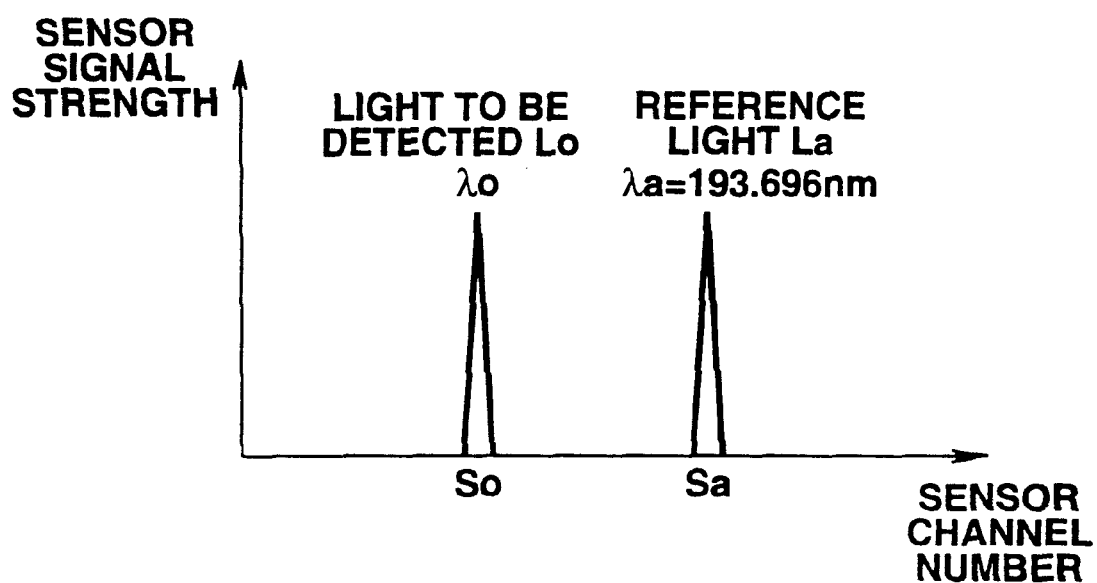
FIG. 35 is a diagram showing a relation between a sensor channel number and a sensor signal strength to illustrate prior technology.

Narrowbanding is performed by driving (e.g., adjusting an installation angle of the etalon or the grating) a narrowbanding element such as the etalon or the grating disposed within narrowbanding module 26 shown in FIG. 34 by laser wavelength controller 20 through driver 46. The wavelength is controlled so that a spectral central wavelength does not change during exposing.

Therefore, a relative wavelength of the oscillation laser beam LO to the reference light LC is kept detected by the monitor module 22 shown in FIG. 19 during exposing to detect absolute wavelength $\lambda O$ of the oscillation laser beam LO. And, the detected result is fed back, so that the narrowbanding element is driven to fix the central wavelength of the spectrum of the oscillation laser beam LO to a target wavelength.

Figure 24:
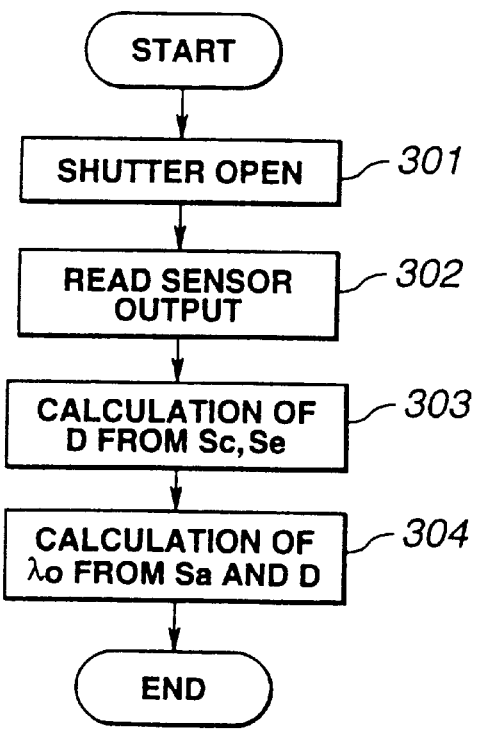
FIG. 24 is a flowchart showing a procedure of calculating a wavelength of a light to be detected.

The laser wavelength controller 20 performs the wavelength detecting process shown in FIG. 24 to be described afterward and controls to fix the aforesaid wavelength on the basis of the result of detecting the wavelength.

Here, the principle applied to this embodiment will be described.

Figure 20:
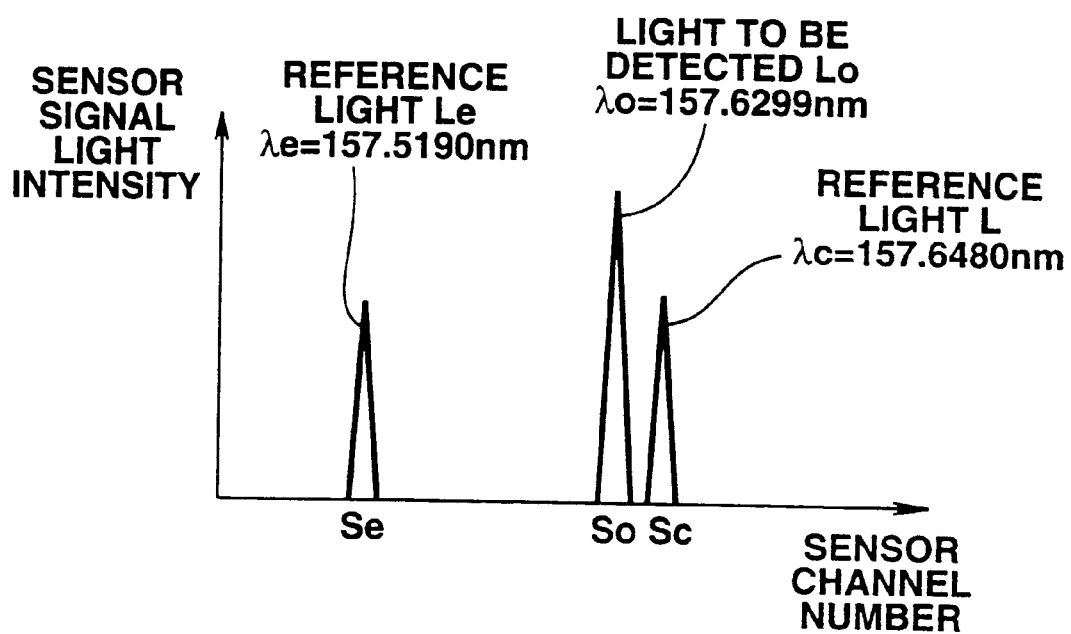
FIG. 20 is a diagram showing a relation between a sensor channel number and a sensor signal strength when a reference light source for outputting oscillation lines of iron and carbon is uses.

FIG. 20 shows a relation between the channel number S (positions on the line sensor) and the sensor signal strength of the sensor 10. The sensor 10 has a plurality of light-receiving channels, and the light-detecting positions on the line sensor is determined according to the channel number having detected the light of maximum intensity. In the line sensor, because an incidence position on the line sensor is different according to the wavelength, the wavelength of the light can be detected from the light detecting position of the line sensor. Therefore, the wavelength of the light is determined from the channel number having detected the light.

Here, the wavelengths of the emission lines of carbon C, iron Fe, sodium Na, fluorine F, magnesium Mg, aluminum Al, argon Ar, calcium Ca, scandium Sc, chromium Cr, manganese Mn, nickel Ni, copper Cu, germanium Ge, arsenic As, bromine Br and platinum Pt are approximate to wavelength $\lambda O$=157.6299 nm of the fluorine molecule F2 laser emission line as shown in the aforesaid table and this light intensity is at a predetermined level or higher, so that it is suitable as the reference light when the subject light LO is the fluorine molecule F2 laser emission line.

The fluorine molecule F2 laser beam L has two emission lines L1 and L2 having a different wavelength and a different light intensity.

Figure 22:
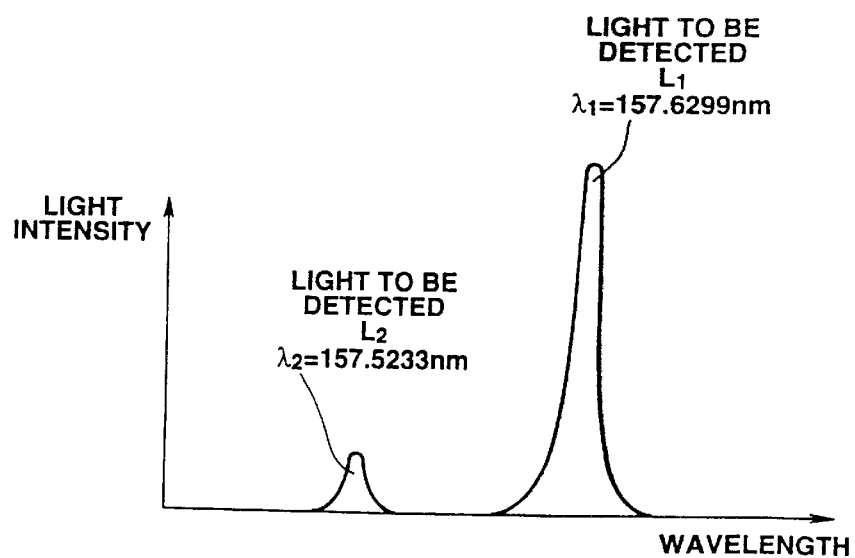
FIG. 22 is a diagram showing two emission lines possessed by the Fluorine molecule F2 laser.

FIG. 22 shows the two emission lines L1, L2 possessed by the fluorine molecular F2 laser beam.

As shown in FIG. 22, the fluorine molecular F2 laser beam has the two emission lines L1, L2, and wavelength $\lambda 1$ of the emission line L1 of high light intensity is 157.6299 nm, while wavelength $\lambda$ of the emission line L2 of low light intensity is 157.5233 nm.

But, when the stepper exposes the semiconductor substrate or the like to the laser beam and the laser beam having two emission lines is irradiated to a substrate through a lens and a mask, there is a disadvantage that spectrum purity of the laser beam lowers and the mask pattern limits micrifying of a design rule due to a chromatic aberration.

Therefore, one emission line is used as a light source for lithography. In this case, it is desirable to select the emission line L1 of high luminescence intensity between the emission lines L1 and L2. The emission line L2 may also be selected.

When the emission line L1 is detected as the subject light L1 by using one reference light, since the wavelength $\lambda 1$ of the subject light L1 is 157.6299 nm, the emission line of carbon C having wavelength $\lambda C$=157.6480 nm most approximate to the wavelength $\lambda 1$ is suitable as the reference light.

Similarly, when the emission line L2 is detected as the subject light L2 by using one reference light, since wavelength $\lambda 2$ of the subject light L2 is 157.5233 nm, the emission line of iron Fe having wavelength $\lambda e$=157.5190 nm most approximate to the wavelength $\lambda 2$ is suitable as the reference light.

Figure 23:
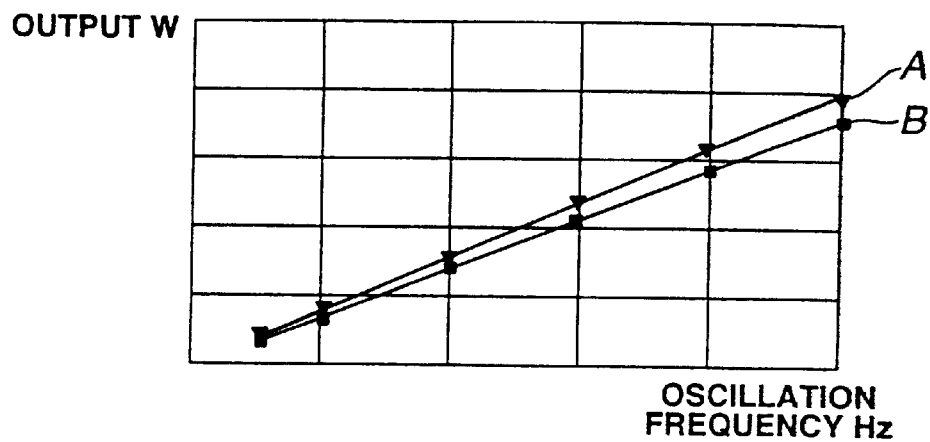
FIG. 23 is a diagram showing the comparison of the output of the fluorine molecule F2 laser having two emission lines possessed by the fluorine molecule F2 laser.

FIG. 23 shows a comparison of output of the fluorine molecule F2 laser between the emission lines L1 and L2.

In FIG. 23, characteristic A is the emission line L1 having wavelength $\lambda 1$=157.6299 nm, and characteristic B is the emission line L2 having wavelength $\lambda 2$=157.5233 nm. As shown in FIG. 23, the emission line L1 has higher output than the emission line L2 along the entire range of the oscillating frequency. Therefore, the emission line L1 is optimally used as the light source for lithography.

Therefore, it is preferable to select only L1 having higher output between the emission lines L1 and L2.

Though the width of the emission line in a state of natural emission of the fluorine molecule F2 laser is about 1 pm, it is preferably narrowbanded to 0.2 pm or below when an aligner for producing semiconductors is configured by a refraction type demagnifying projection lens.

When the aforesaid subject light and reference light are detected on the line sensor 10, a wavelength of the light is determined from the channel number indicating the detection position.

And, the dispersion value D (wavelength corresponding to the channel interval of the line sensor 10) of the spectroscope 7 can be used to convert a difference between channel number SC or Se having detected the reference line LC or Le of the emission lines of carbon C and iron Fe and the channel number SO having detected the subject light LO into a relative wavelength of the subject light LO to the reference light LC or Le. And, wavelength $\lambda O$ of the subject light LO can be calculated from this determined relative wavelength and the wavelength $\lambda C$ (=157.6480 nm) or $\lambda e$ (=157.5190 nm) of the reference light LC or Le.

The wavelength of the oscillation line of the aforesaid element is approximate to the wavelength of the emission line of the fluorine molecule F2 laser. Therefore, only one of the aforesaid emission lines of the respective elements can be used as the reference light to detect the wavelength of the subject light in the same way. In this case, it is desirable to decrease as low as possible an error between the subject light and the reference light by using the emission line of an element having a wavelength most approximate to the wavelength of the subject light. For example, when the emission line LC of carbon C having wavelength λC=157.6480 nm most approximate to wavelength λ=157.6299 nm of the emission line of the subject light LO is used as the reference light, the error with the subject light LO can be minimized.

Now, calculation of wavelength λO of the subject light LO executed on the basis of the wavelength λC of the reference light LC and the wavelength λe of the reference light Le will be described specifically with reference to the flowchart of FIG. 24.

As shown in FIG. 24, the controller 20 opens the shutter 6 of the wavelength detector shown in FIG. 21 to allow the subject light LO and the reference lights LC, Le enter the spectroscope 7 (step 301).

In the next step 302, output of the sensor 10 is read.

As shown in FIG. 20, the sensor channel numbers Se, SO, SC corresponding to three peaks of the sensor signal strength are output from the sensor 10. Here, wavelength NC of the oscillation line of carbon C is λC=157.6480 nm (in a vacuum), wavelength λe of the oscillation line of iron Fe is λe=157.5190 nm (in a vacuum), and λO of the oscillation line of the subject light LO is larger than he and smaller than λC (λO=157.6299 nm).

Therefore, SO, which is larger than the channel number Se having detected the oscillation line of iron Fe and smaller than the channel number SC having detected the oscillation line of carbon C, is determined as the channel number having detected the oscillation laser beam LO (step 302).

Then, the dispersion value D (wavelength for a channel of the sensor 10a) is calculated by using the channel numbers Se, SC having detected the two reference lights Le, LC and the known wavelengths λe (=157.5190 nm) and λC (=157.6480 nm) of the two reference lights Le, LC as indicated by the following expression (15).

$$D=(\lambda C-\lambda e)/(SC-Se) \quad (15)$$

Then, wavelength λO of the subject light LO is determined by using the aforesaid dispersion value D as indicated by the following expression (16).

$$\lambda O=\lambda e+(SO-Se)\cdot D \quad (16)$$

Specifically, relative wavelength (SO−Se)·D of the subject light LO to the reference light Le is determined by multiplying the dispersion value D by a difference between the channel number SO having detected the subject light SO and the channel number Se having detected the reference light Le. And, wavelength λO of the subject light LO is calculated by adding the known wavelength λe of the reference light Le to the relative wavelength (SO−Se)·D. In the aforesaid expression (16), the channel number Se and the wavelength λe of iron Fe are used, but the channel number SC and the wavelength λC of carbon C may be used instead of them (step 303).

As described above, according to this embodiment, the actual dispersion value D of the spectroscope 7 is determined, and the wavelength λO of the subject light LO is calculated on the basis of the actual dispersion value D, so that even if the characteristic of the spectroscope 7 is changed due to an individual difference among the spectroscopes 7 or a change in the measuring environment, wavelength λO of the subject light LO output from the subject light source 1 can be detected accurately without an error.

In the aforesaid embodiment, it is assumed that the relation between the channel position S of the sensor 10 and the wavelength λ is substantially linear as indicated by the expression (15).

Now, an embodiment which is suitable when the relation between the channel position S of the sensor 10 and the wavelength λ is not linear will be described. For example, it is suitably used when a width for a channel of the sensor 10 is not uniform.

Spectroscope 7" of a diffraction grating type shown in FIG. 12 may be used instead of the diffraction grating type spectroscope 7 shown in FIG. 21.

Figure 25:
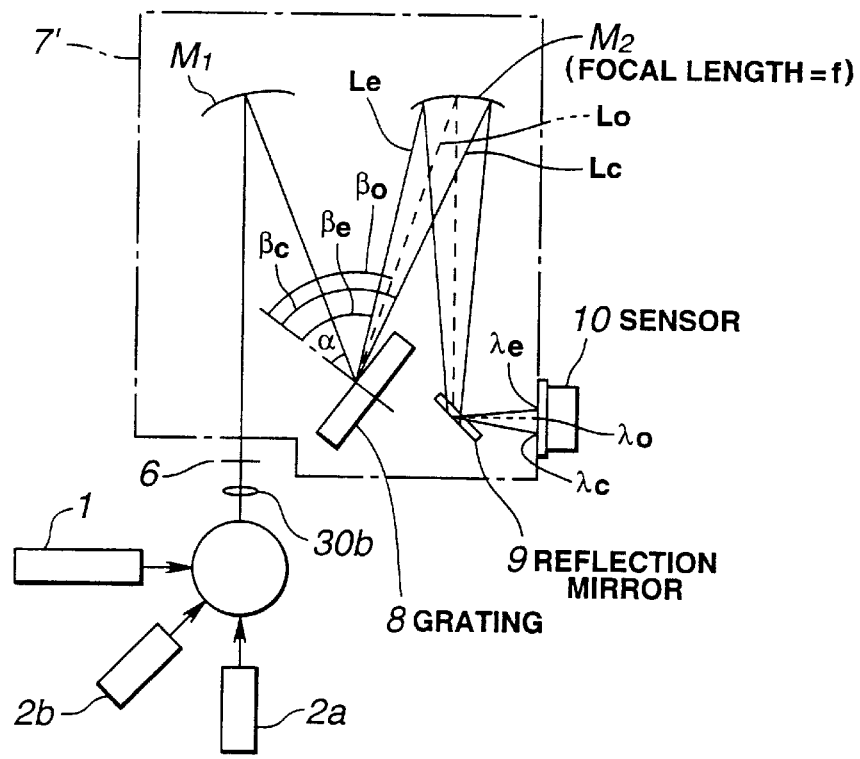
FIG. 25 is a diagram showing an arrangement of an optical system in a spectroscope.

FIG. 25 shows an arrangement of the optical system within the spectroscope when grating spectroscope 7' of Czerny-Turner type is used instead of the spectroscope 7 of FIG. 19.

As shown in FIG. 25, when the subject light LO and the reference lights Le, LC are entered the spectroscope 7', they are first entered concave mirror M1, and the reflected lights are entered the grating 8. The incidence angle to the grating 8 is assumed to be α. The outgoing angle for the grating 8 is variable depending on the wavelength of the incident light. It is assumed that the outgoing angle of the reference light Le having the wavelength λe is βe, the outgoing angle of the reference light LC having the wavelength λC is βC and the outgoing angle of the subject light LO having the wavelength λO is βO. The subject light LO and the reference lights Le, LC diffracted by the grating 8 are entered the concave mirror M2, and the reflected lights are led to the sensor 10 via reflector 9. The focal distance of the concave mirror M2 is assumed to be f (mm).

The controller 20 makes the same processing as in steps 301, 302.

In this embodiment, the subject light LO and the reference lights Le, LC are entered the spectroscope 7' simultaneously to measure three detection positions on the sensor 10 at the same time. And, the channel number Se which corresponds to a peak central wavelength is determined by interpolating the three channel positions where the sensor signal strength becomes a peak. Channel numbers Se, SO are determined by interpolating similarly.

And, the following processing is executed instead of steps 303, 304.

The density of the number of grooves and the diffraction degree of the grating 8 are assumed to be N (gr/mm) and m respectively below. And, the width for 1 ch (channel) of the light-receiving channels of the sensor 10 is assumed to be MCD (mm/ch).

Then, the following expressions (17), (18), (19), (20) and (21) are established from the relation between the incidence angle and the outgoing angle of the grating 8.

$$N \cdot m \cdot \lambda e = \sin \alpha + \sin \beta e \quad (17)$$

$$N \cdot m \cdot \lambda C = \sin \alpha + \sin \beta C \quad (18)$$

$$N \cdot m \cdot \lambda O = \sin \alpha + \sin \beta O \quad (19)$$

$$\beta C = \beta e + \delta \beta eC = \beta e + deC/f \quad (20)$$

$$\beta O = \beta e + \delta \beta eO = \beta e + deO/f \quad (21)$$

where, deC=(Se−SC)·MCD and deO=(Se−SO)·MCD.

Then, from the expression (17)—the expression (18), N·m(λe−λC)=sin βe−sin βC is obtained, and N·m(λe−λC)= sin βe−sinβC=k is set.

Then, by substituting expression (20) in the above expression, the following are obtained. Sin βe−sin (βe+deC/f)=k 2 sin (−deC/2f)·cos (βe+deC/2f)=k Then, the following expression (22) is obtained:

$$\beta e = \cos^{-1}(k/2 \sin(-deC/2f)) - deC/2f \quad (22)$$

From the expressions (17) and (22), the following is calculated.

$$\sin \alpha = N \cdot m \cdot \lambda e - \sin \beta e \quad (23)$$

And, from the expressions (21) and (22), the following is calculated.

$$\sin \beta O = \sin[\cos^{-1}\{k/2 \cdot \sin(-deC/2f) - deC/2f\} + deO/f] \quad (24)$$

Then, from the expressions (19), (23) and (24), wavelength $\lambda O$ is calculated as follows.

$$\lambda O = (\sin \alpha + \sin \beta O)/(N \cdot m) \quad (25)$$

Thus, this embodiment can also detect the wavelength $\lambda O$ of the subject light LO in view of the actual characteristic value of the spectroscope 7'.

In the aforesaid embodiment, as shown in FIG. 20, the oscillation line Le of iron Fe having the wavelength $\lambda e=157.5190$ nm smaller than the wavelength $\lambda O=157.6299$ nm of the subject light LO and the oscillation line LC of carbon C having the wavelength $\lambda C=157.6480$ nm larger than that of the same subject light LO are used as the reference lights. But, types (kinds of elements) of the reference light, a magnitude of the wavelength to the subject light LO and the number of reference lights are not significant as long as the reference light has a wavelength approximate to that of the subject light LO.

Figure 26:
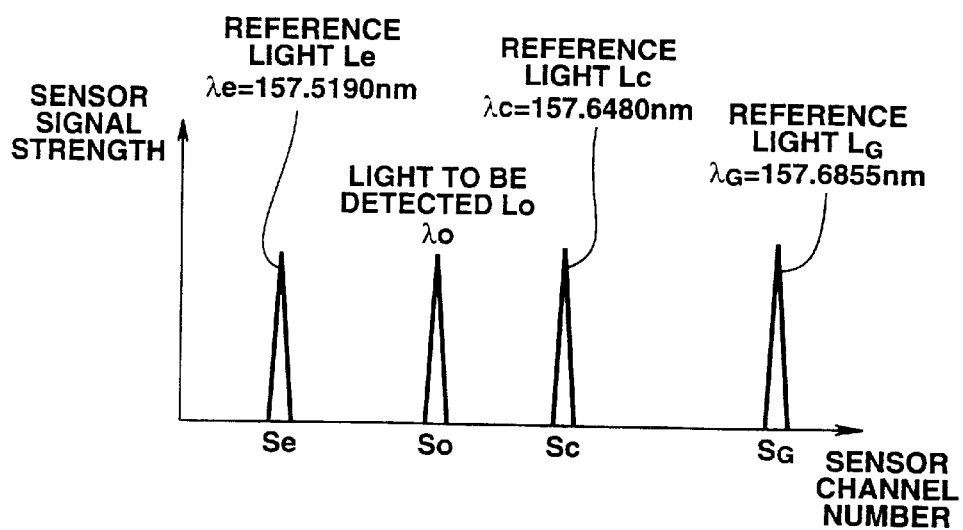
FIG. 26 is a diagram showing a relation between a sensor channel number and a sensor signal strength when a reference light source for outputting oscillation lines of iron, carbon and germanium is used.

As shown in FIG. 26, three reference lights of oscillation line Le (detection channel number Se of the sensor 10) of iron Fe having wavelength $\lambda e=157.5190$ nm smaller than that of the subject light LO, and oscillation line LC (detection channel number SC of the sensor 10) of carbon C having wavelength $\lambda C=157.6480$ nm and oscillation line LG (channel number SG of the sensor 10) of germanium Ge having wavelength $\lambda G=157.6855$ nm respectively larger than the wavelength of the subject light LO may be used.

And, iron Fe, carbon C, germanium Ge, sodium Na and argon Ar can be combined appropriately so to be used as the reference light.

When arsenic As and germanium Ge are combined, a hollow cathode lamp having arsenic As and germanium Ge mixed can be used as the reference light source 2.

As shown in FIG. 26, when three elements are used for the reference lights, three dispersion values D1, D2, D3 are obtained by determining the dispersion value D of the spectroscope 7 from the aforesaid expression (15) by sequentially selecting two elements. In this case, the average value of the three dispersion values D1, D2, D3 may be determined as final dispersion value D of the spectroscope 7.

As shown in FIG. 20, when wavelength $\lambda O$ of the subject light LO is between the wavelengths $\lambda e$ and $\lambda C$ of the two reference lights Le, LC, there is provided an advantage that wavelength $\lambda O$ of the subject light LO can be determined accurately by interpolating. This is because the relation between each sensor position of the line sensor 10 and the wavelength is not completely linear.

Now, a wavelength detector using the Fabry-Perot etalon spectroscope will be described with reference to FIG. 27 and FIG. 28.

Figure 27:
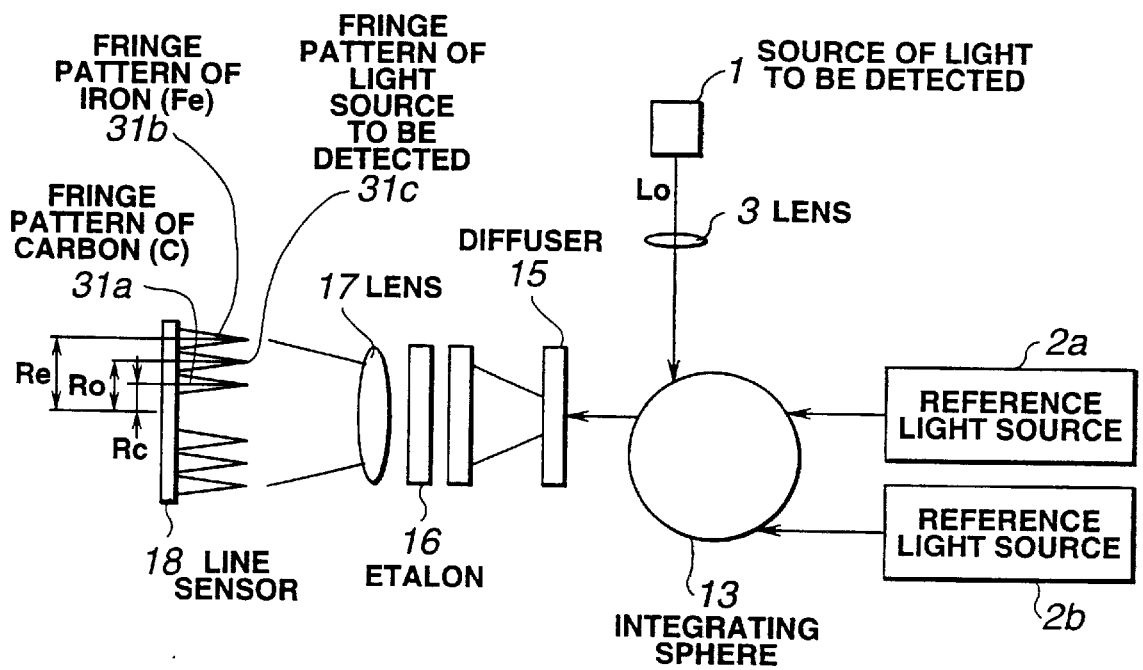
FIG. 27 is a diagram showing an example of a structure of the wavelength detector using a Fabry-Perot etalon spectroscope.

In this wavelength detector as shown in FIG. 27, the subject light LO which is the oscillation laser beam LO output from the subject light source 1 is irradiated to the diffuser 15 through leans 3 and integrating sphere 13. The subject light LO is scattered from the diffuser 15 and irradiated to etalon 16. Meanwhile, reference lights LC (oscillation line of carbon C) and Le (oscillation line of iron Fe) output from the reference light sources 2a, 2b are scattered by the diffuser 15 through the integrating sphere 13 and irradiated to the etalon 16.

Here, the etalon 16 has its inside walls made of two transparent plates which are partial reflection mirrors. The etalon 16 allows the reference lights LC, Le and the subject light L respectively having a different wavelength to pass through it.

The light having permeated through the etalon 16 is entered the converging lens 17. The converging lens 17 is for example an achromatic lens with chromatic aberration corrected, and the chromatic aberration is corrected as the light permeates through the achromatic converging lens 17.

The line sensor 18 is set on the focus of the converging lens 17, so that the light through the converging lens 17 is imaged on the line sensor 18, fringe pattern 31a corresponding to wavelength $\lambda C$ of the reference light LC (carbon C), fringe pattern 31b corresponding to wavelength $\lambda e$ of the reference light Le (iron Fe) and fringe pattern 31c corresponding to wavelength $\lambda O$ of the subject light LO are formed on the detection surface of the line sensor 18. These fringe patterns are concentrically formed on the line sensor 18.

The radius of the fringe pattern 31a corresponding to carbon C from the center of the line sensor 18 is Rc, the radius of the fringe pattern 31b corresponding to iron Fe from the center of the line sensor 18 is Re, and the same radius of the fringe pattern 31c corresponding to the subject light LO is RO.

The line sensor 18 detects the radii RC, Re and RO from the center of the line sensor to each imaging position of the fringe patterns.

Figure 28:
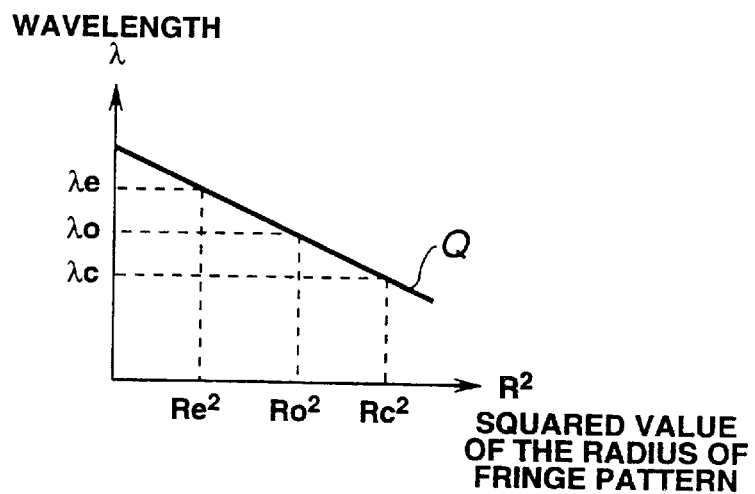
FIG. 28 is a diagram showing a relation between the second power of a radius of a fringe pattern and a wavelength.

Here, a relation between the second power R2 of the radius from the center of the line sensor to the imaging position of the fringe pattern and the wavelength $\lambda$ of the light imaged on the line sensor is approximate to a theoretically linear relation as shown in FIG. 28.

Specifically, the relations between the second powers RC2, Re2 of the radii of the fringe patterns 18a, 18b of the reference lights LC, Le and the wavelengths $\lambda C$ and $\lambda e$ are indicated by a linear function, and its coefficient can be determined. Namely, the inclination of straight line Q is determined.

Thus, since the imaging position of the fringe pattern 18c of the subject light LO, namely the radius RO of the fringe pattern 18c, is detected by the line sensor 10, the second power $RO^2$ of the radius can be determined, and wavelength $\lambda O$ corresponding to the second power RO of the radius can be determined as a wavelength of the subject light LO from the straight line Q shown in FIG. 28.

In order to use as the light source for lithography as described above, only the emission line L1 between the emission lines L1, L2 is required to be selected.

Then, an embodiment of selecting only L1 of high power between the emission lines L1, L2 will be described.

Figure 29A:
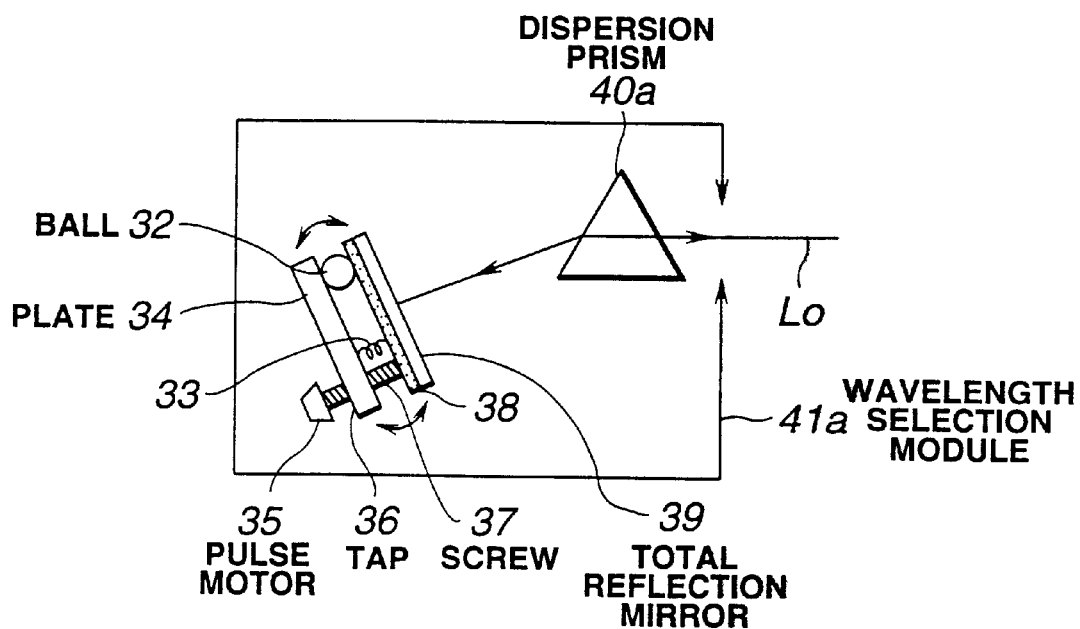
FIG. 29($a$) is a diagram showing a wavelength selection module using a dispersion prism, and FIG. 29($b$) is a diagram showing a wavelength selection module using a Littrow prism.

FIG. 29(a), (b) are diagrams showing wavelength selecting modules 41a, 41b for selecting an emission line of high power from two emission lines having a different wavelength of the fluorine molecule F2 laser.

FIG. 29(a) is a diagram showing the wavelength selecting module 41a using dispersion prism 40a.

As shown in FIG. 29(a), this wavelength selecting module 41a roughly comprises dispersion prism 40a which selects a wavelength by allowing the entered oscillation laser beam LO to pass through, total reflection mirror 39 which totally reflects the oscillation laser beam LO having entered through the dispersion prism 40a, and pulse motor 35 which changes the set angle of the total reflection mirror 39 to a desired angle.

Ball 32, an elastic body such as spring 33 and screw 37 are disposed between plate 38 on the back of the total reflection mirror 39 and plate 34 on the side where the pulse motor 35 is disposed. The pulse motor 35 is mounted on the plate 34 with tap 36 therebetween. The screw 37 is designed to rotate as the pulse motor 35 rotates. And, the spring 33 operates so that the plate 34 and the plate 38 pull to each other.

In the wavelength selecting module 41a using the dispersion prism 40a, the screw 37 is rotated by the rotation of the pulse motor 35, the position of the tap 36 is moved, the plates 34, 38 are moved to rotate around the ball 32 at the center, and the set angle of the total reflection mirror 39 is changed to a desired angle. Thus, the reflection angle of the oscillation laser beam L1 entered through the dispersion prism 40a is changed. As a result, the outgoing position of the oscillation laser beam L1 outwent from the dispersion prism 40a is changed, and the oscillation laser beam L1 of the emission line of high power is outwent from the wavelength selecting module 41a.

Thus, an emission line of high power can be selected from the two emission lines having a different wavelength possessed by the fluorine molecule F2 laser.

Here, a distance between the total reflection mirror 39 and the dispersion prism 40a may be short.

Figure 29B:
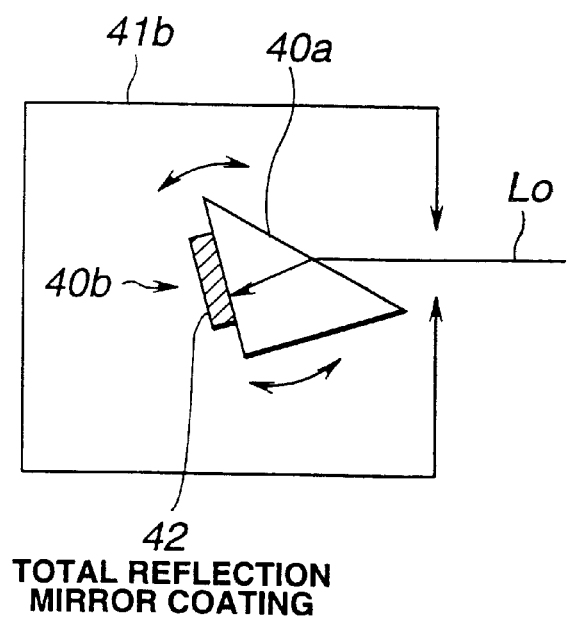

FIG. 29(b) is a diagram showing the wavelength selecting module 41b using Littrow prism 40b.

As shown in FIG. 29(b), the wavelength selecting module 41b comprises the Littrow prism 40b having total reflection mirror coat 42 formed on the reflection surface of the dispersion prism 40a.

By the wavelength selecting module 41b using this Littrow prism 40b, a distance between the total reflection mirror and the dispersion prism 40a can be made short as the total reflection mirror coat 42 is formed on the reflection surface of the dispersion prism 40a.

Thus, optical attenuation in an optical path between the total reflection mirror and the dispersion prism 40a is decreased, and power of the oscillation laser beam LO can be increased.

As described above, a spectral line width of the fluorine molecule F2 laser in a state of natural luminescence is approximately 1 pm, but when an aligner for producing semiconductors is configured by a refraction type demagnifying projection lens, it is required to be narrowbanded to 0.2 pm or below. And, the dispersion prism 40a is preferably not coated because AR (antireflection) coating loses durability in a region of wavelength of 157 nm. Accordingly, durability becomes very high.

Now, an embodiment of narrowbanding the oscillation laser beam will be described.

Figure 30A:
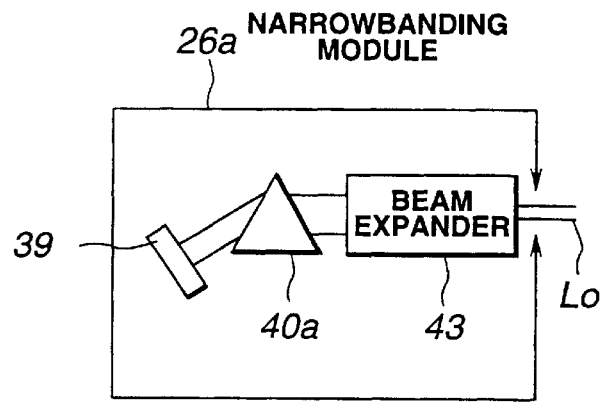
FIG. 30($a$) is a diagram showing a narrowbanding module using a dispersion prism, FIG. 30($b$) is a diagram showing a narrowbanding module using a grating, and FIG. 30($c$) is a diagram showing a narrowbanding module using a plurality of dispersion prisms.
Figure 30B:
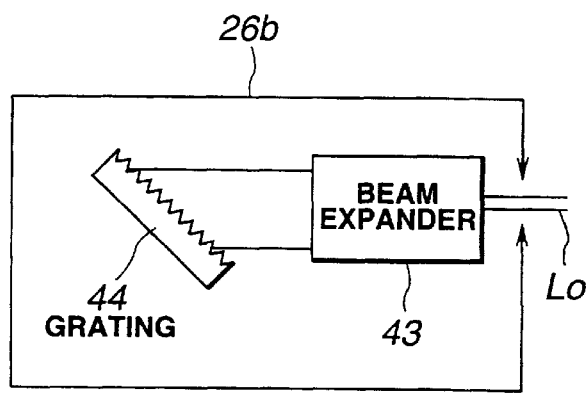

FIGS. 30(a), 30(b) and 30 (c) are diagrams showing narrowbanding modules 26a, 26b, 26c for narrowbanding the fluorine molecule F2 laser beam.

The narrowbanding module 26a of FIG. 30(a) comprises dispersion prism 40a, total reflection mirror 39 and beam expander 43 which expands a beam width of the incident oscillation laser beam.

In the narrowbanding module 26a, the oscillation laser beam LO having its beam width expanded by the beam expander 43 is entered the dispersion prism 40a, so that resolution of the dispersion prism 40a is enhanced, and the spectral line width of the oscillation laser beam LO output from the dispersion prism 40a is narrowed.

Thus, the oscillation laser beam can be narrowbanded.

The narrowbanding module 26b of FIG. 30(b) comprises grating 44 which selects a wavelength by reflecting the incident oscillation laser beam LO and beam expander 43.

In the narrowbanding module 26b, the oscillation laser beam LO having its beam width expanded by the beam expander 43 is reflected by the grating 44, so that resolution of the grating 44 is enhanced, and the spectral line width of the oscillation laser beam LO reflected by the grating 44 is narrowed.

Thus, the oscillation laser beam can be narrowbanded.

Figure 30C:
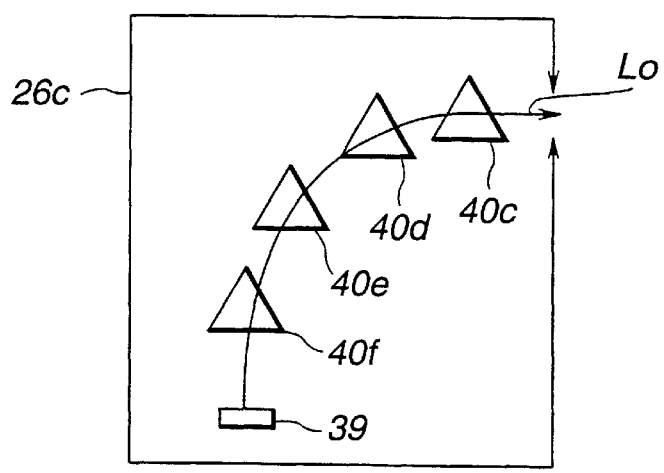

The narrowbanding module 26c of FIG. 30(c) comprises four dispersion prisms 40c, 40d, 40e, 40f and total reflection mirror 39.

By this narrowbanding module 26c, the resolution of the dispersion prism is quadrupled by the four dispersion prisms 40c, 40d, 40e, 40f, and the spectral line width of the oscillation laser beam LO output through the dispersion prisms 40c, 40d, 40e, 40f is narrowed. Namely, the resolution is doubled for the number of dispersion prisms. Thus, the oscillation laser beam LO can be narrowbanded.

The number of dispersion prisms is four in this embodiment but not limited to it and may be more than four. Though the resolution is improved by increasing the number of dispersion prisms, there is a disadvantage that the narrowbanding module 26c has a large size.

In the aforesaid embodiment, the emission line is used as the reference light for detecting the wavelength of the fluorine molecule F2 laser, but the absorption line may be used to detect the wavelength of the fluorine molecule F2 laser.

Now, an embodiment of a wavelength detector for detecting a wavelength of the fluorine molecule F2 laser by using the absorption line will be described with reference to FIG. 14 and FIG. 16. First, an embodiment in that the spectral line width of the absorption line is narrower than the spectral line width of the fluorine molecule F2 laser will be described.

Oscillation laser beam LO of predetermined power is emitted as the subject light LO from the subject light source 1, which is the fluorine molecule F2 laser device, via front mirror 21.

Absorption cell 23 has sealed therein germanium Ge gas having absorption line BG having wavelength $\lambda G=157.6282$ nm or nitrogen N gas having absorption line $\lambda N$ having wavelength $\lambda N=157.5210$ nm as the absorption line to the emission line of the fluorine molecule F2 laser.

Absorption line BN of the nitrogen N gas has wavelength $\lambda N$ of 157.5210 nm which is approximate to wavelength $\lambda 1=157.6299$ nm of the emission line L1 of the fluorine molecule F2 laser. And, the absorption line BG of the germanium Ge gas has wavelength $\lambda G$ of 157.6282 nm which is approximate to wavelength $\lambda 2=157.5233$ nm of the emission line L2 of the fluorine molecule F2 laser.

Therefore, an absolute wavelength of the oscillation laser beam LO can be detected by adjusting wavelength $\lambda O$ of the narrowbanded oscillation laser beam LO to the wavelengths of the absorption lines BG, BN.

The subject light LO is entered the beam splitter 5a within the monitor module 22. The subject light LO is partly reflected by the beam splitter 5a and entered the beam splitter 5b. The subject light LO is also partly permeated through the beam splitter 5b and entered the absorption cell 23. The rest of the subject light LO reflected by the beam splitter 5b is irradiated to diffuser 15b and scattered, and its light intensity is detected by photodiode 24. The subject light LO having passed through the absorption cell 23 is irradiated to the diffuser 15a. The subject light LO is scattered from the diffuser 15a and entered the spectroscope 7. And, as described above, a detection position of the subject light LO on the line sensor is determined according to the channel number having detected the light of maximum intensity by a plurality of light-receiving channels on the sensor 10, and wavelength $\lambda$O of the subject light LO is determined from the channel number having detected the subject light LO.

Figure 31:
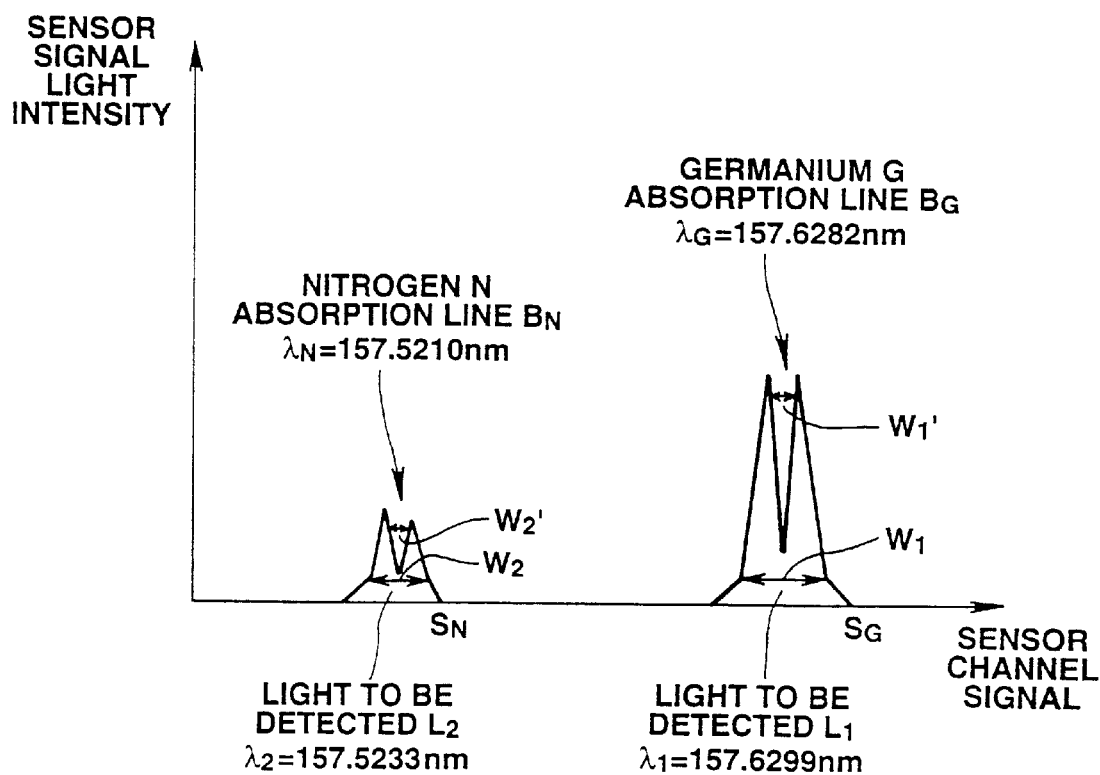
FIG. 31 is a diagram showing a state that light intensity of two emission lines of fluorine molecule F2 laser is minimized by an absorption line having a spectral line width narrower than that of the emission line.

FIG. 31 shows a state that subject light L1 or L2 of the fluorine molecule F2 laser of natural luminescence is permeated through the absorption cell 23 (nitrogen N gas or germanium Ge gas sealed), and light intensities of the emission lines of the subject lights L1, L2 are minimized by the absorption lines BG, BN having a spectral line width narrower than those of the emission lines L1, L2.

When germanium Ge gas is charged, a through type hollow cathode lamp may be used.

The sensor 10 is provided with a plurality of light-receiving channels, and a light-detecting position on the sensor 10 is determined according to the channel number having detected the light of maximum intensity. The sensor 10 can detect a wavelength of the light in view of the light-detecting position of the sensor 10 because an incidence position on the sensor 10 is different depending on a wavelength. Therefore, the wavelength of the light is determined from the channel number having detected the light.

It is assumed that germanium Ge gas is sealed in the absorption cell 23. Then, the subject light L1 having passed through the germanium Ge gas enters spectroscope 7 through the diffuser 15a, and light intensity of its spectrum is detected by channel number SG on the sensor 10.

In this case, an absorption line having spectral line width W1' narrower than emission line width W1 of the subject light L1 is included in the emission light width W1 of the subject light L1. Specifically, the emission line width W of the subject light L1 having wavelength $\lambda$1=157.6299 nm includes wavelength $\lambda$G=157.6282 nm of germanium Ge. Therefore,,the light intensity of a portion corresponding to the wavelength $\lambda$G=157.6282 nm in the emission line of the subject light L1 is minimized by the absorption line BG.

When it is assumed that nitrogen N gas is sealed in the absorption cell 23, the subject light L2 passes through the nitrogen N gas, and its intensity is detected by channel number SN on the sensor 10.

In this case, the absorption line having spectral line width W2' narrower than emission line width W2 of the subject light L2 is included in the emission line width W2 of the subject light L2. Specifically, wavelength $\lambda$N=157.5210 nm of nitrogen N is included in the emission line width W2 of the subject light L2 having wavelength $\lambda$2=157.5233 nm. Therefore, the light intensity of a portion corresponding to wavelength $\lambda$N=157.5210 nm in the emission line of the subject light L2 is minimized by the absorption line BN.

Now, an embodiment in that a spectral line width of the absorption line is wider than the spectral line width of the fluorine molecule F2 laser will be described with reference to the aforesaid FIG. 16.

In this case, the oscillation laser beam LO with a predetermined power is emitted as the subject light LO from the subject light source 1 which is the fluorine molecule F2 laser device via front mirror 21.

And, the subject light LO is entered the beam splitter 5a in the monitor module 22. The subject light LO is partly reflected by the beam splitter 5a and entered the beam splitter 5b. The subject light LO is also partly permeated through the beam splitter 5b and entered the beam splitter 5c. And, the rest of the subject light LO reflected by the beam splitter 5b is irradiated to the diffuser 15b and scattered, and its light intensity is detected by photodiode 24. The subject light LO is partly reflected by the beam splitter 5c and entered the absorption cell 23. And, the subject light LO is permeated through the absorption cell 23, and its light intensity is detected by light intensity detector 25.

Meanwhile, part of the subject light LO having permeated through the beam splitter 5c is irradiated to the diffuser 15a. The subject light LO is scattered from the diffuser 15a and entered the spectroscope 7. And, wavelength $\lambda$O of the subject light LO is determined from the channel number having detected the light intensity of the subject light LO on the sensor 10 as described above.

As shown in FIG. 17, subject light L1 or L2 of the fluorine molecule F2 laser of natural luminescence is permeated through the absorption cell 23 (nitrogen N gas or germanium Ge gas sealed), and light intensities of the emission lines of the subject lights L1, L2 are minimized by absorption lines BG, BN having a spectral line width narrower than those of the emission lines L1, L2.

Now, it is assumed that germanium Ge gas or nitrogen N gas is sealed in the absorption cell 23. And, the light intensity of the subject light L1 or L2 is detected by the light-receiving channel on the light intensity detector 25 after passing the subject light L1 or L2 through the germanium Ge gas or nitrogen N gas.

At this time, the emission lines of the subject lines L1, L2 are changed from light intensity H1 to minimum light intensity H2 by the absorption line having spectral line widths W1', W2' wider than emission line widths W1, W2 of the subject lights L1 and L2.

Then, as to a case that germanium Ge gas is sealed in the absorption cell 23, processing for detecting a wavelength of the oscillation laser beam L1 using the absorption line BG of germanium Ge having a spectral line width narrower than the emission line width of the fluorine molecule F2 laser will be described with reference to FIG. 14, FIG. 32, FIG. 33 and FIG. 34.

Figure 32A:
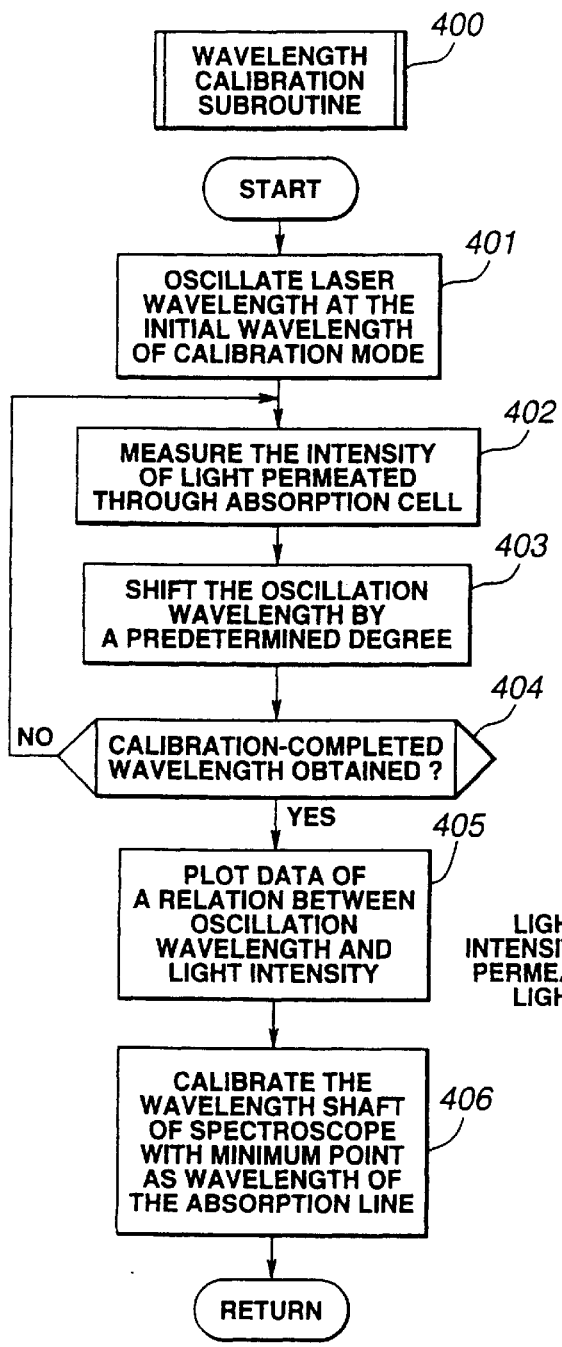
FIG. 32($a$) is a diagram showing a flowchart of controlling a wavelength of an oscillation laser beam using absorption lines, and FIG. 32($b$) is a diagram showing a relation between an oscillating wavelength and light intensity.
Figure 32B:
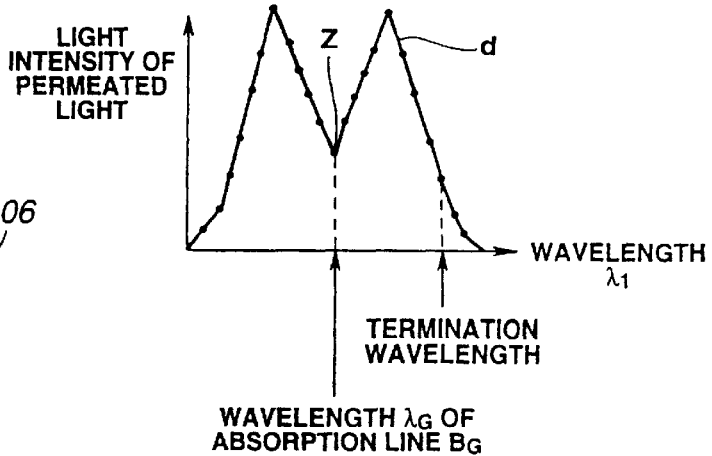
Figure 33:
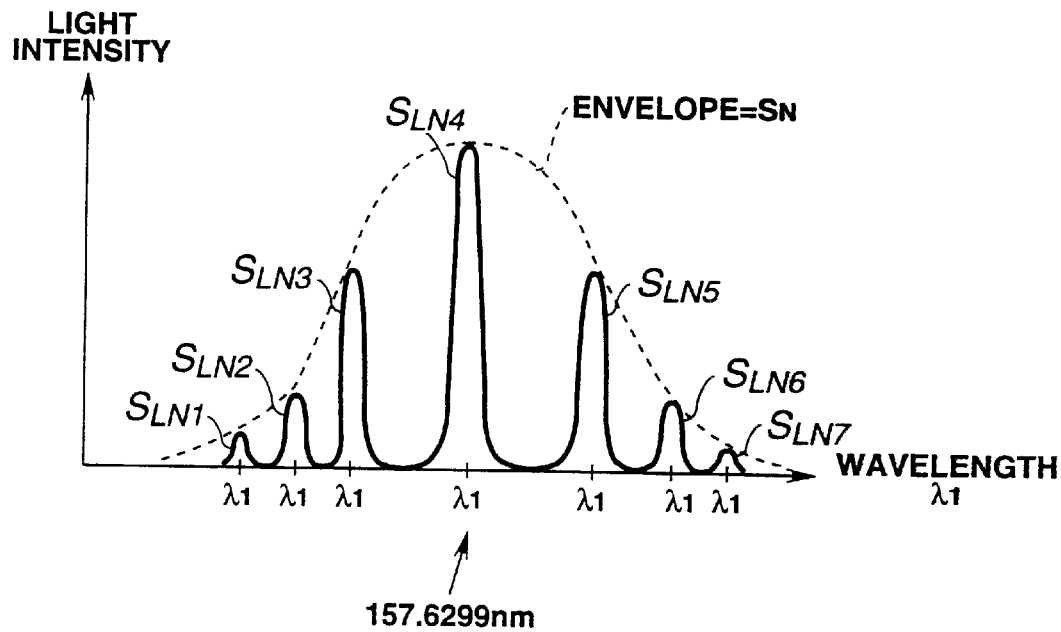
FIG. 33 is a diagram showing a state that light intensity of the spectrum of a narrowbanded oscillation laser beam is changed with a change in oscillating wavelength.

FIG. 32(a) is a flowchart of controlling a wavelength of the oscillation laser beam L1 using an absorption line, and FIG. 32(b) is a diagram showing a relation among oscillating wavelength $\lambda$1, wavelength $\lambda$G of absorption line BG and light intensity. FIG. 33 is a diagram showing a state that light intensity of the spectrum of the narrowbanded oscillation laser beam L1 is varied due to a change in the oscillating wavelength $\lambda$1.

In the flowchart of FIG. 32(a), the laser wavelength controller 27 shown in FIG. 34 performs a wavelength calibration subroutine for fixing central wavelength $\lambda$1 of the spectrum of the oscillation laser beam L1 shown in FIG. 33 to a target wavelength on the basis of an externally given instruction signal (step 401).

When the wavelength calibration subroutine is performed, the oscillating wavelength $\lambda$1 of the oscillation laser beam L1 is oscillated at a predetermined initial wavelength (step 401).

Then, light intensity of the oscillation laser beam L1, which has permeated through the absorption cell 23 having germanium Ge gas sealed therein and passed through the diffuser 15a and the spectroscope 7, is determined on the sensor 10 in the monitor module 22 shown in FIG. 14. At this time, a light detection position on the sensor 10 is determined according to the channel number having detected the light of maximum intensity. But, the channel number on the sensor 10 for detecting the light intensity of the spectrum of the oscillation laser beam is variable depending on a change in the oscillating wavelength λ1 (step 402).

Then, the oscillating wavelength λ1 of the oscillation laser beam L1 is changed from the initial wavelength by a predetermined degree by the laser wavelength controller 20. Thus, minimum point Z where the light intensity of the spectrum of the oscillation laser beam D1 becomes minimum is searched (step 403).

And, it is judged whether the oscillating wavelength λ1 has become a calibration-completed wavelength (step 404).

When it is judged that the oscillating wavelength λ1 of the oscillation laser beam L1 is not a calibration-completed wavelength (judgment NO in step 204), the procedure is returned to steps 202 and 203, and the oscillating wavelength λ1 of the oscillation laser beam L1 is further changed by a predetermined degree. Meanwhile, when the oscillating wavelength λ1 of the oscillation laser beam L1 has become a calibration-completed wavelength (judgment YES in step 204), data d about a relation between the oscillating wavelength λ1 and the light intensity is plotted as shown in FIG. 32(b) (step 205).

And, the light intensity of the spectrum of the oscillation laser beam L1 detected on the sensor 10 as indicated by point Z of data d shown in FIG. 32(b) is minimized by the absorption line BG. Because the wavelength of the minimum point Z is wavelength λG=157.6282 nm of the absorption line BG, the central wavelength λ1 of the spectrum of the oscillation laser beam L1 entered the light-receiving channel Sz on the sensor 10 corresponding to the position of the minimum point Z is calibrated to wavelength λG=157.6282 nm of the absorption line BG. Thus, the light-receiving channel S on the sensor 10 corresponding to the position of the minimum point Z is clarified. And, a difference of wavelength between the light-receiving channels on the sensor 10 is determined according to a distance between the spectroscope 7 and the sensor 10 and the characteristic of the lens and can be indicated as constant δ. Therefore, wavelength λ1 of unknown oscillation laser beam L1 whose light intensity is detected on the sensor 10 can be determined by using the wavelength λG=157.6282 nm of the absorption line BG, the number of channels X between the light-receiving channel Sz and the light-receiving channel SG for detecting the wavelength λ1 of the unknown oscillation laser beam L1 and the constant δ by the following expression (26) (step 406).

$$\lambda 1=157.6282\pm X\times \delta \qquad (26)$$

Now, processing of detecting a wavelength of the oscillation laser beam L1 using the absorption line BG of germanium Ge having a spectral line width wider than the emission line width of the fluorine molecule F2 laser will be described with reference to FIG. 16, FIG. 32, FIG. 33 and FIG. 34.

First, processing of steps 400 to 401 shown in FIG. 32(a) is performed.

Then, light intensity of the spectrum of the oscillation laser beam L1 having permeated through the absorption cell 23 having germanium Ge gas sealed therein is detected on the light intensity detector 24 in the monitor module 22 shown in FIG. 16 (step 402).

Then, oscillating wavelength λ1 of the oscillation laser beam L1 is changed from an initial wavelength by a predetermined degree by the laser wavelength controller 20 shown in FIG. 34. Thus, a minimum point where the spectrum of the oscillation laser beam L1 detected by the light intensity detector 24 has a minimum light intensity is searched (step 403).

Then, processing of steps 404 to 405 shown in FIG. 32(a) is performed.

As a result, oscillating wavelength λ1 of the oscillation laser beam L1 to be entered the light-receiving channel Sz on the sensor 10, when the light intensity of the spectrum of the oscillation laser beam L1 detected on the light intensity detector 24 in step 403 is minimized by the absorption line BG, becomes wavelength λG=157.6282 nm of the absorption line BG. Therefore, wavelength λ1 of the unknown oscillation laser beam L1 whose light intensity is detected on the sensor 10 can be determined from the aforesaid expression (26) by using the wavelength λG=157.6282 nm of the absorption line BG, the number of channels X between the light-receiving channel Sz and the light-receiving channel SG for detecting the wavelength λ1 of the unknown oscillation laser beam L1 and the aforesaid constant δ (step 206).

As described above, when wavelength λ1=157.6299 nm of the oscillation laser beam L1 of the fluorine molecule F2 laser is to be detected, germanium Ge having wavelength λG=157.6282 nm is used as the absorption line. And, when wavelength λ2=157.5233 nm of the oscillation laser beam L2 is to be detected, nitrogen N having wavelength λN=157.5210 nm is used as the absorption line. Thus, wavelengths λ1 and 2 of the subject lights L1, L2 can be detected accurately. Therefore, the central wavelength λO of the spectrum of the oscillation laser beam LO can be prevented from varying during exposing.

What is claimed is:

1. A wavelength detector which enters a reference light emitted from a reference light source and a light to be detected emitted from a source of light to be detected into a spectroscope, guides the reference light and the light to be detected to a sensor, and calculates a wavelength of the light to be detected on the basis of detection positions of the reference light and the light to be detected on the sensor, a characteristic value of the spectroscope and a known wavelength of the reference light, wherein:

at least two reference lights having different wavelengths are emitted as the reference light from the reference light source;

an actual characteristic value of the spectroscope is calculated on the basis of detection positions of the at least two reference lights on the sensor and known wavelengths of the at least two reference lights; and the wavelength of the light to be detected is calculated on the basis of the detection positions of the reference lights and the light to be detected on the sensor, the calculated actual characteristic value of the spectroscope and the known wavelengths of the reference lights.

2. A wavelength detector which enters reference light emitted from a reference light source and a light to be detected emitted from a source of light to be detected into a spectroscope, guides the reference light and the light to be detected to a sensor, and calculates a wavelength of the light to be detected on the basis of detection positions of the reference light and the light to be detected on the sensor, a dispersion value of the spectroscope and a known wavelength of the reference light, wherein:

at least two reference lights having different wavelengths are emitted as the reference light from the reference light source;

an actual dispersion value of the spectroscope is calculated on the basis of detection positions of the at least two reference lights on the sensor and known wavelengths of the at least two reference lights; and the wavelength of the light to be detected is calculated on the basis of the detection positions of the reference lights and the light to be detected on the sensor, the calculated actual dispersion value of the spectroscope and the known wavelengths of the reference lights.

3. A wavelength detector which enters a reference light emitted from a reference light source and a light to be detected emitted from a source of light to be detected into a spectroscope, guides the reference light and the light to be detected to a sensor, and calculates a wavelength of the light to be detected on the basis of detection positions of fringe patterns of the reference light and the light to be detected on the sensor and a known wavelength of the reference light, wherein:

at least two reference lights having different wavelengths are emitted as the reference light from the reference light source;

a relation between positions of the fringe patterns on the sensor and the wavelengths of the lights led to the sensor is calculated on the basis of detection positions of the fringe patterns of the at least two reference lights on the sensor and known wavelengths of the at least two reference lights; and a wavelength of the light corresponding to the detected position of the fringe pattern of the light to be detected on the sensor is determined from the calculated relation so to calculate the wavelength of the light to be detected.

4. A wavelength detector according to claim 1, wherein the light to be detected which is emitted from the source of light to be detected is an oscillation laser beam output from an argon fluorine excimer laser, and the at least two reference lights having different wavelengths emitted from the reference light source are emission lines of arsenic As and neon Ne.

5. A wavelength detector according to claim 4, wherein the reference light source is an arsenic lamp using neon Ne as buffer gas.

6. A wavelength detector for detecting a wavelength of a light to be detected, which is output from a source of light to be detected, on the basis of a wavelength of a reference light emitted from a reference light source, wherein:

when the light to be detected is an argon fluorine excimer laser emission line, at least one emission line is used as the reference light among three emission lines of platinum Pt which have a wavelength most approximate to a wavelength of the argon fluorine excimer laser emission line and light intensity at a predetermined level or higher.

7. A wavelength detector for detecting a wavelength of a light to be detected which is output from a source of light to be detected on the basis of an absorption line which minimizes light intensity of the light to be detected, wherein:

when the light to be detected is an argon fluorine excimer laser emission line, at least one absorption line is used as an absorption line to the argon fluorine excimer laser emission line among absorption lines of platinum Pt, arsenic As, neon Ne, carbon C and germanium Ge that have a wavelength approximate to a wavelength of the argon fluorine excimer laser emission line.

8. A wavelength detector for detecting a wavelength of a light to be detected, which is output from a source of light to be detected, on the basis of a wavelength of a reference light emitted from a reference light source, wherein:

when the light to be detected is a fluorine molecule F2 laser emission line, at least one emission line of carbon C, iron Fe, sodium Na, fluorine F, magnesium Mg, aluminum Al, argon Ar, calcium Ca, scandium Sc, chromium Cr, manganese Mn, nickel Ni, copper Cu, germanium Ge, arsenic As, bromine Br or platinum Pt that have a wavelength approximate to that of the fluorine molecule F2 laser emission line and light intensity of a predetermined level or higher is used as the reference light.

9. A wavelength detector for detecting a wavelength of a light to be detected, which is output from a source of light to be detected, on the basis of a wavelength of a reference light emitted from a reference light source, wherein:

when the light to be detected is a fluorine molecule F2 laser emission line, an emission line of either of carbon C or iron Fe or two emission lines of carbon C and iron Fe are used as the reference light.

10. A wavelength detector for detecting a wavelength of a light to be detected which is output from a source of light to be detected on the basis of an absorption line which minimizes light intensity of the light to be detected, wherein when the light to be detected is a fluorine molecule F2 laser emission line, an absorption line of either of nitrogen N or germanium Ge or two absorption lines of nitrogen N and germanium Ge that have a wavelength approximate to a wavelength of the fluorine molecule F2 laser emission line are used as the absorption line to the fluorine molecule F2 laser emission line.

11. A wavelength detector according to claim 2, wherein the light to be detected which is emitted from the source of light to be detected is an oscillation laser beam output from an argon fluorine excimer laser, and the at least two reference lights having different wavelengths emitted from the reference light source are emission lines of arsenic As and neon Ne.

12. A wavelength detector according to claim 11, wherein the reference light source is an arsenic lamp using neon Ne as buffer gas.

13. A wavelength detector according to claim 3 wherein the light to be detected which is emitted from the source of light to be detected is an oscillation laser beam output from an argon fluorine excimer laser, and the least two reference lights having different wavelengths emitted from the reference light source are emission lines of arsenic As and neon Ne.

14. A wavelength detector according to claim 13, wherein the reference light source is an arsenic lamp using neon Ne as buffer gas.

* * * * *